United States Patent
Farley et al.

(10) Patent No.: US 11,966,782 B2
(45) Date of Patent: Apr. 23, 2024

(54) METHOD AND SYSTEM FOR PERFORMING HISTORICAL STATE MANAGEMENT SERVICES FOR COMPOSED INFORMATION HANDLING SYSTEMS

(71) Applicant: Dell Products L.P., Round Rock, TX (US)

(72) Inventors: Douglas L. Farley, Round Rock, TX (US); John S. Harwood, Boston, MA (US); Jimmy Doyle Pike, Georgetown, TX (US); Gaurav Chawla, Austin, TX (US); Tommi Salli, Stamford, CT (US); Robert Anthony Lincourt, Jr., Franklin, MA (US); Sumedh Wasudeo Sathaye, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 455 days.

(21) Appl. No.: 17/484,612

(22) Filed: Sep. 24, 2021

(65) Prior Publication Data
US 2023/0099310 A1 Mar. 30, 2023

(51) Int. Cl.
*G06F 9/50* (2006.01)
(52) U.S. Cl.
CPC .................. *G06F 9/5027* (2013.01)
(58) Field of Classification Search
None
See application file for complete search history.

(56) References Cited

U.S. PATENT DOCUMENTS

| | | | | |
|---|---|---|---|---|
| 5,404,508 A | * | 4/1995 | Konrad | G06F 11/2097 707/640 |
| 8,285,827 B1 | * | 10/2012 | Reiner | G06F 9/50 703/21 |
| 8,588,425 B1 | * | 11/2013 | Harwood | G06F 12/1408 380/278 |
| 9,166,893 B2 | * | 10/2015 | Brandt | H04L 9/3247 |
| 9,426,147 B2 | * | 8/2016 | Smith | H04L 63/083 |
| 9,497,028 B1 | * | 11/2016 | Yu | H04L 63/06 |
| 11,316,669 B2 | * | 4/2022 | Wang | H04L 9/0643 |

* cited by examiner

*Primary Examiner* — Van H Nguyen
(74) *Attorney, Agent, or Firm* — Chamberlain, Hrdlicka, White, Williams & Aughtry; Aly Z. Dossa

(57) ABSTRACT

Techniques described herein relate to a method for performing state management services for composed information handling systems. The method includes determining that at least one control resource set is not associated with a distributed state storage system; instantiating the distributed state storage system using first additional computing resources; registering the at least one control resource set with the distributed state storage system; preparing the at least one control resource set to perform a first portion of the state management services using the distributed state storage system; determining that the at least one control resource set is not associated with an audit storage; instantiating the audit storage using second additional computing resources; registering the at least one control resource set with the audit storage; and preparing the at least one control resource set to perform a second portion of the state management services using the audit storage.

20 Claims, 14 Drawing Sheets

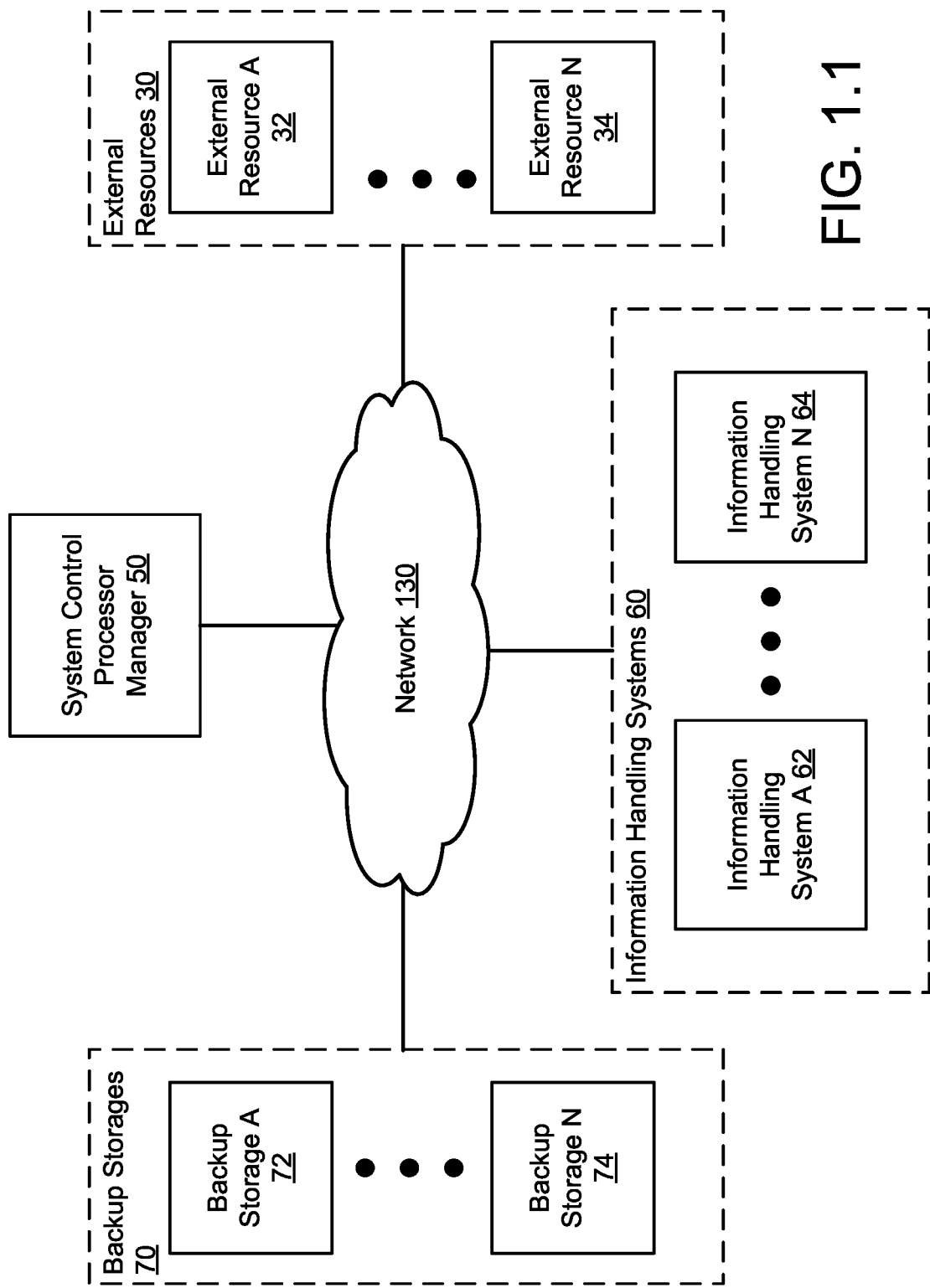
FIG. 1.1

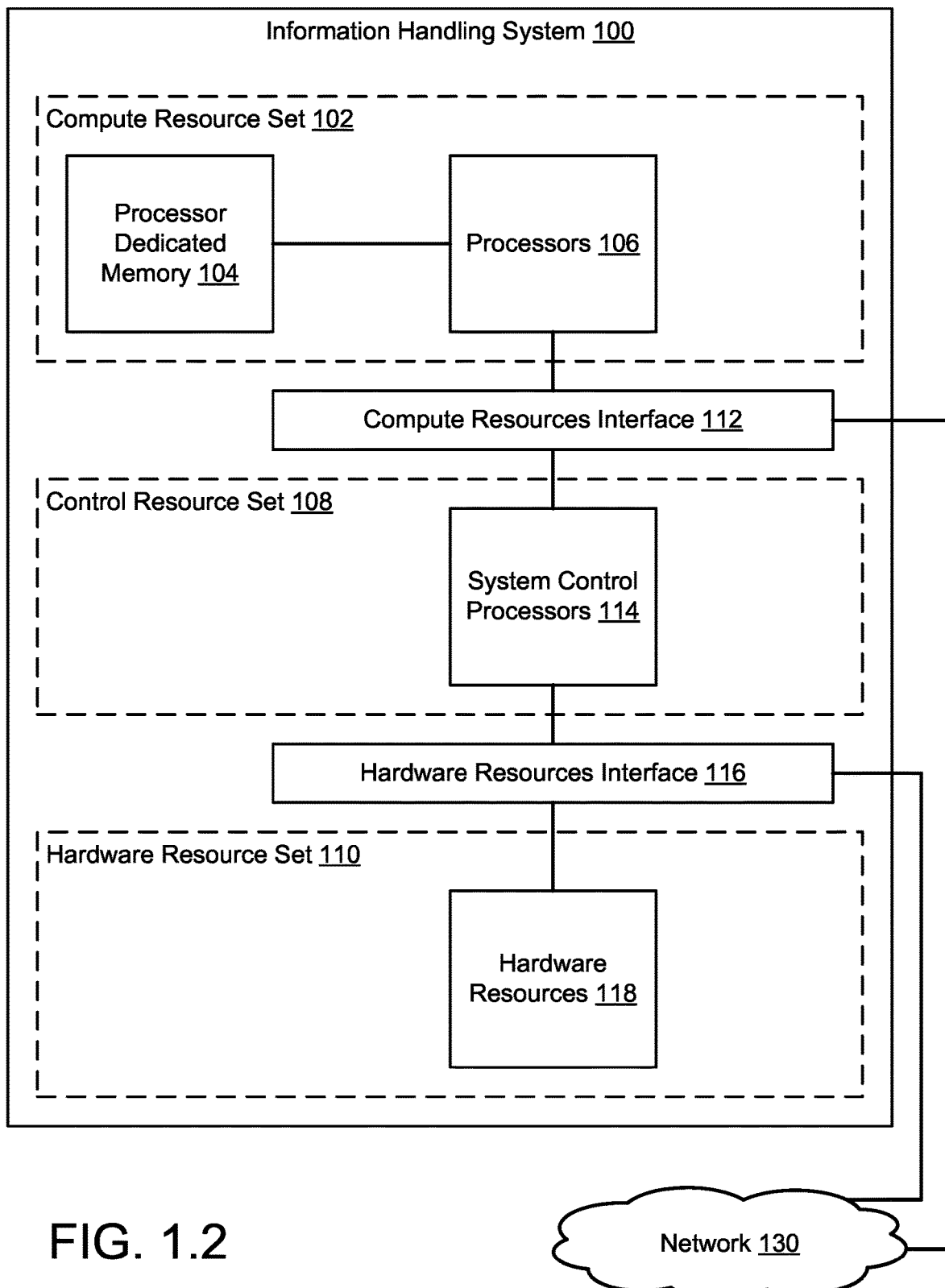
FIG. 1.2

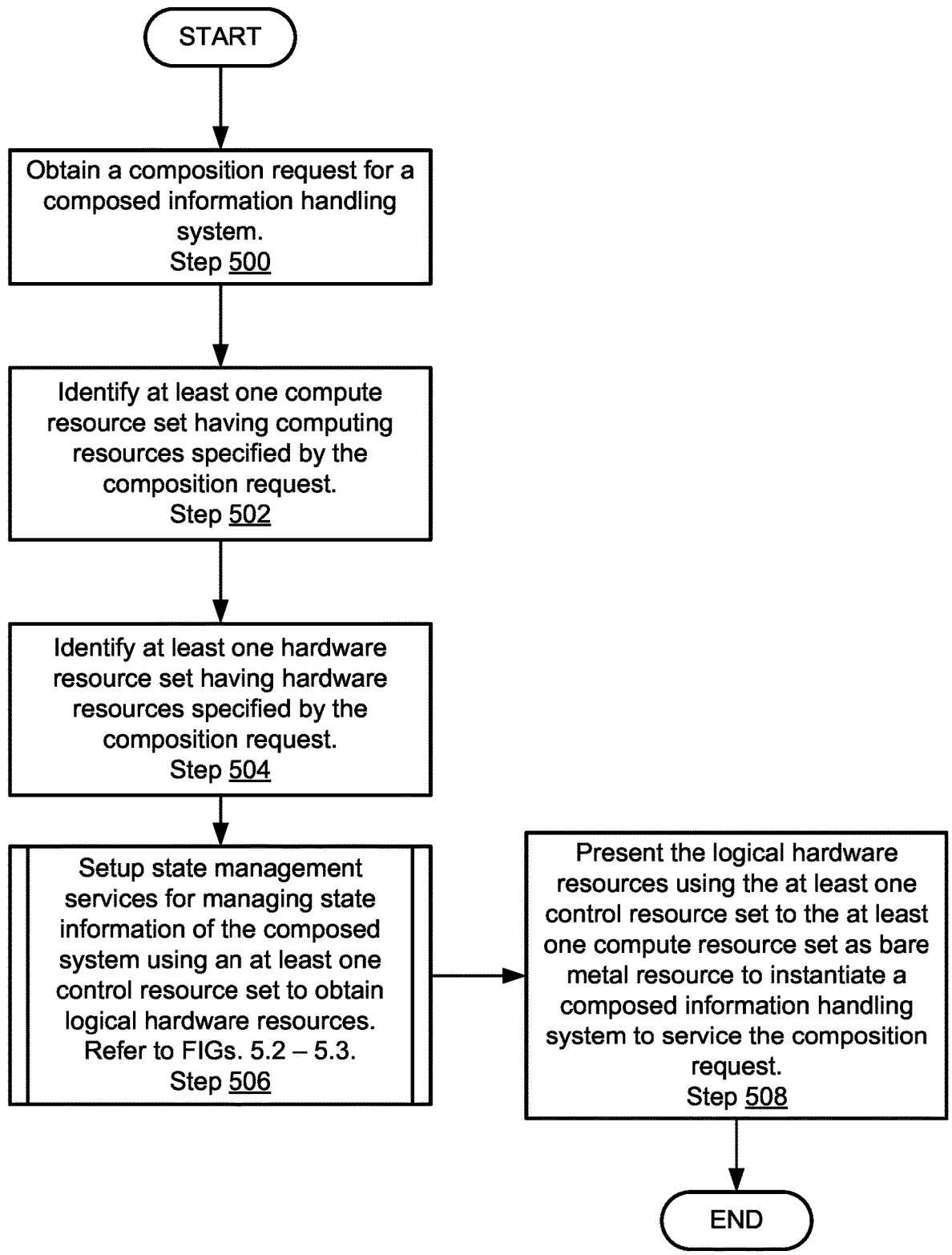
FIG. 5.1

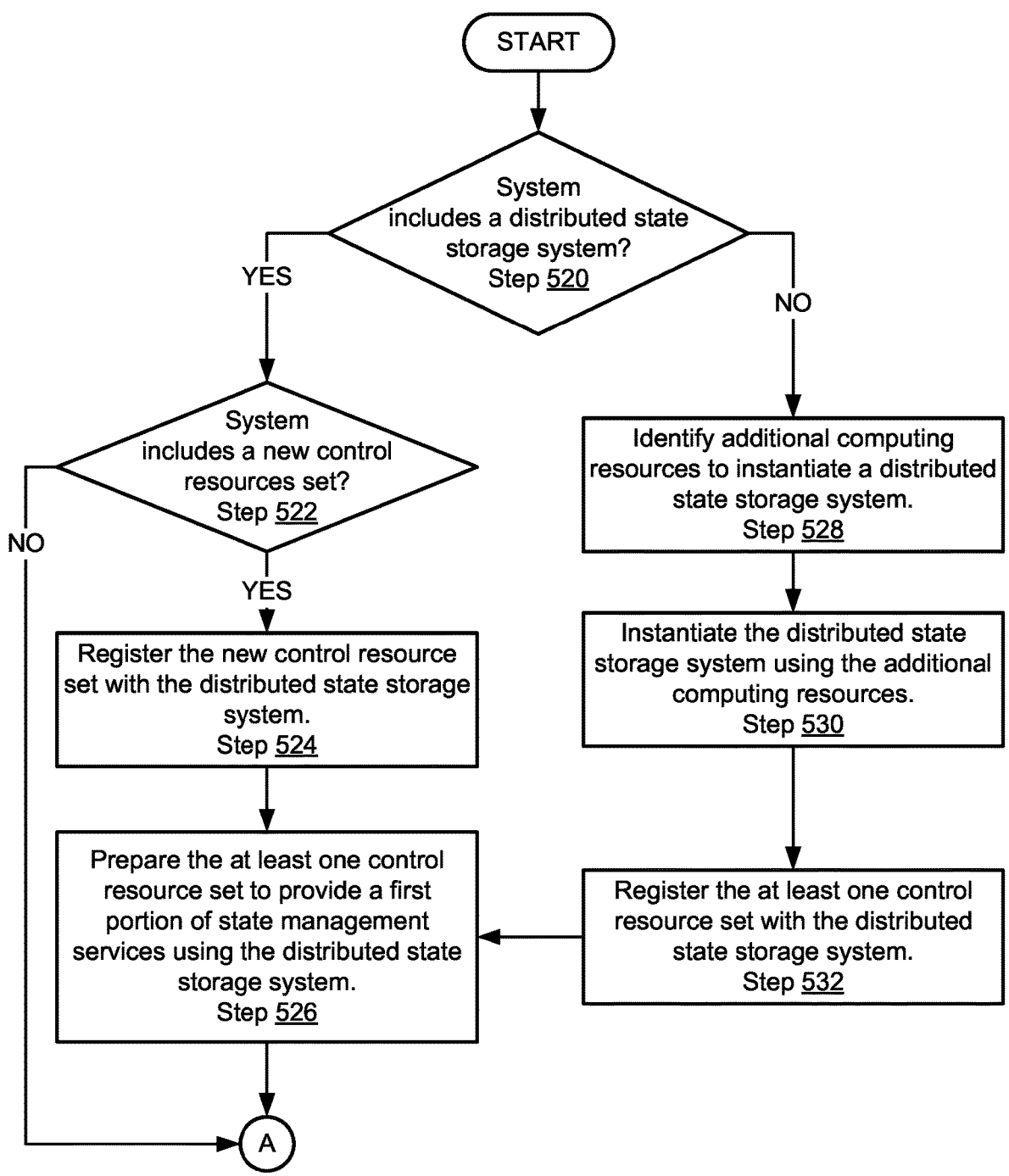
FIG. 5.2

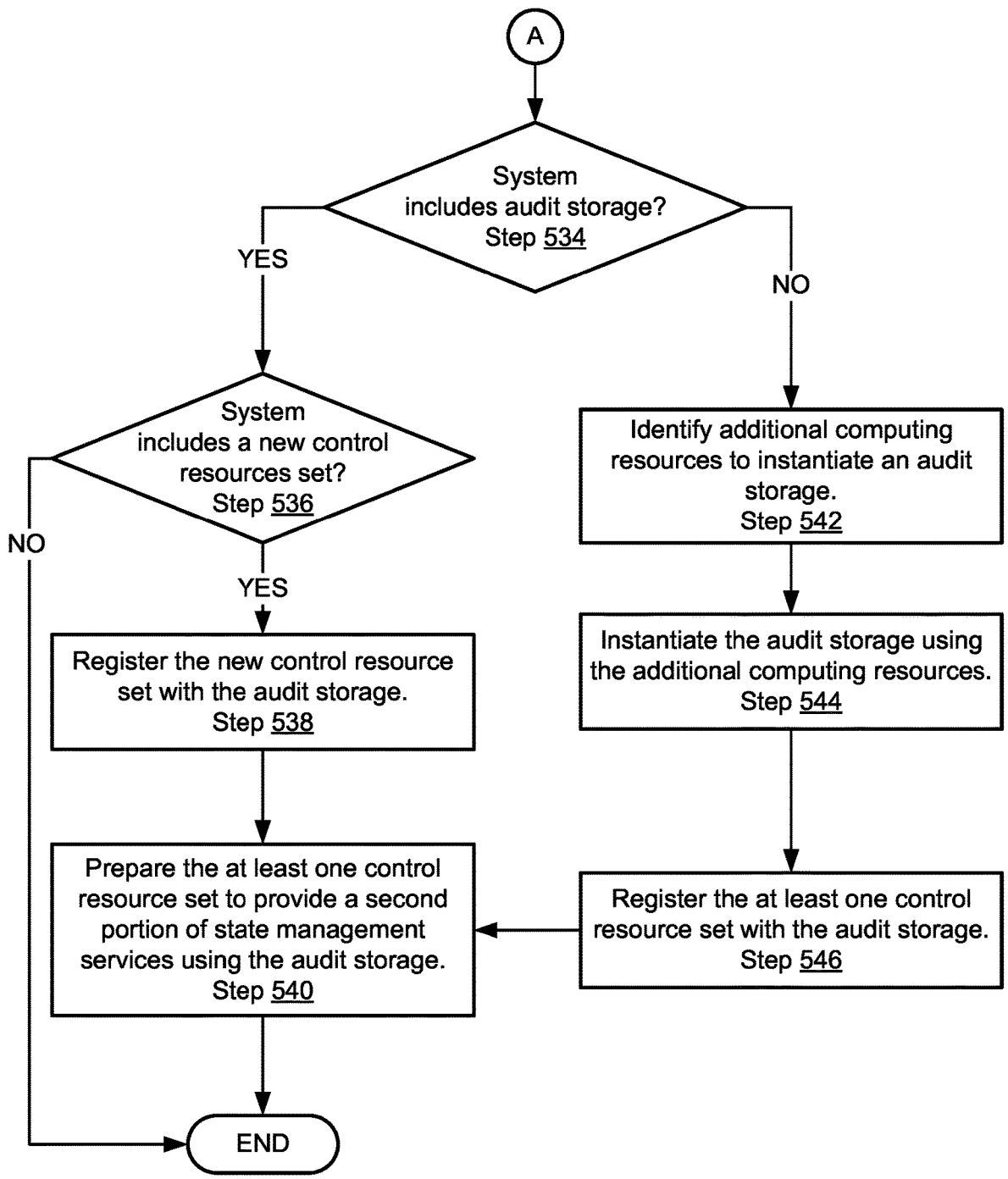
FIG. 5.3

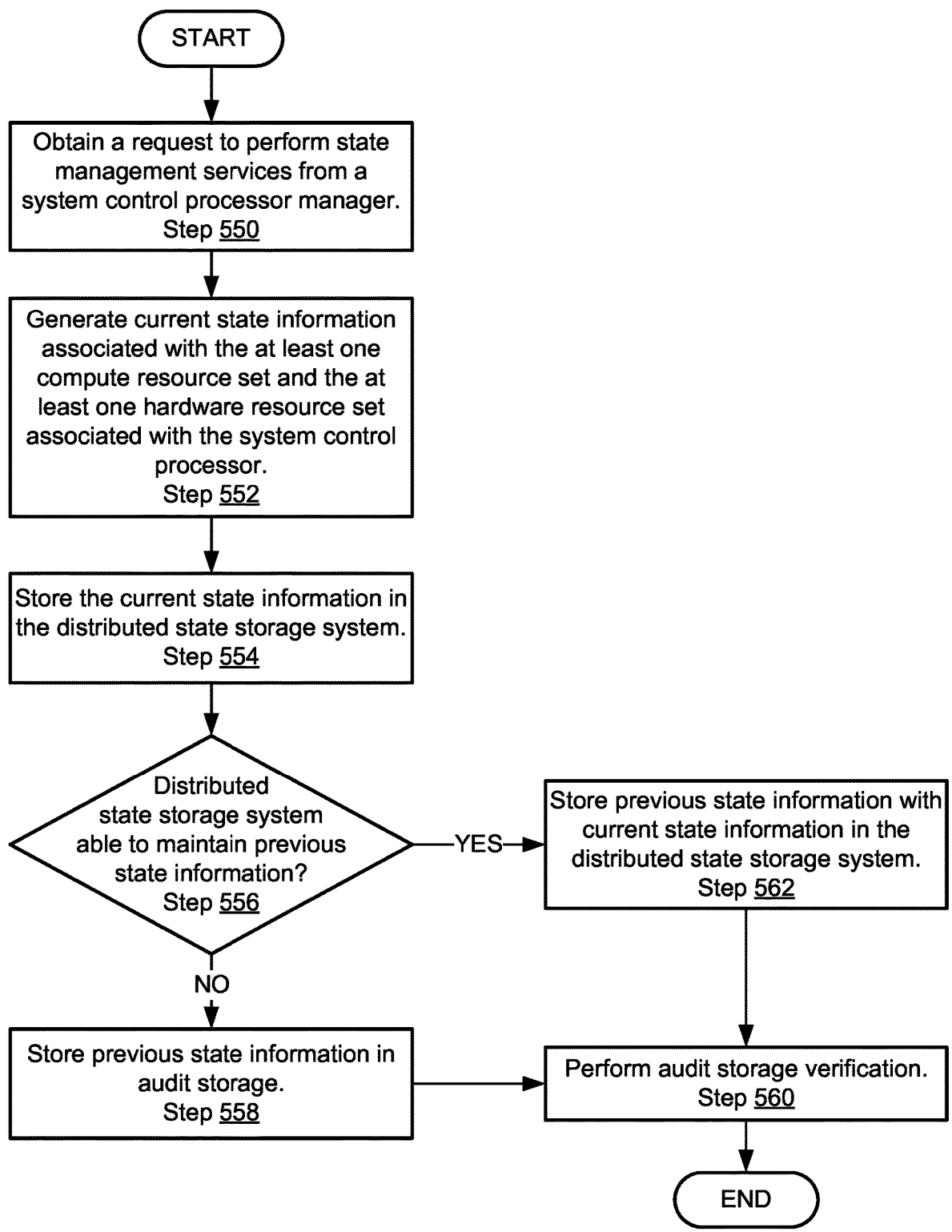
FIG. 5.4

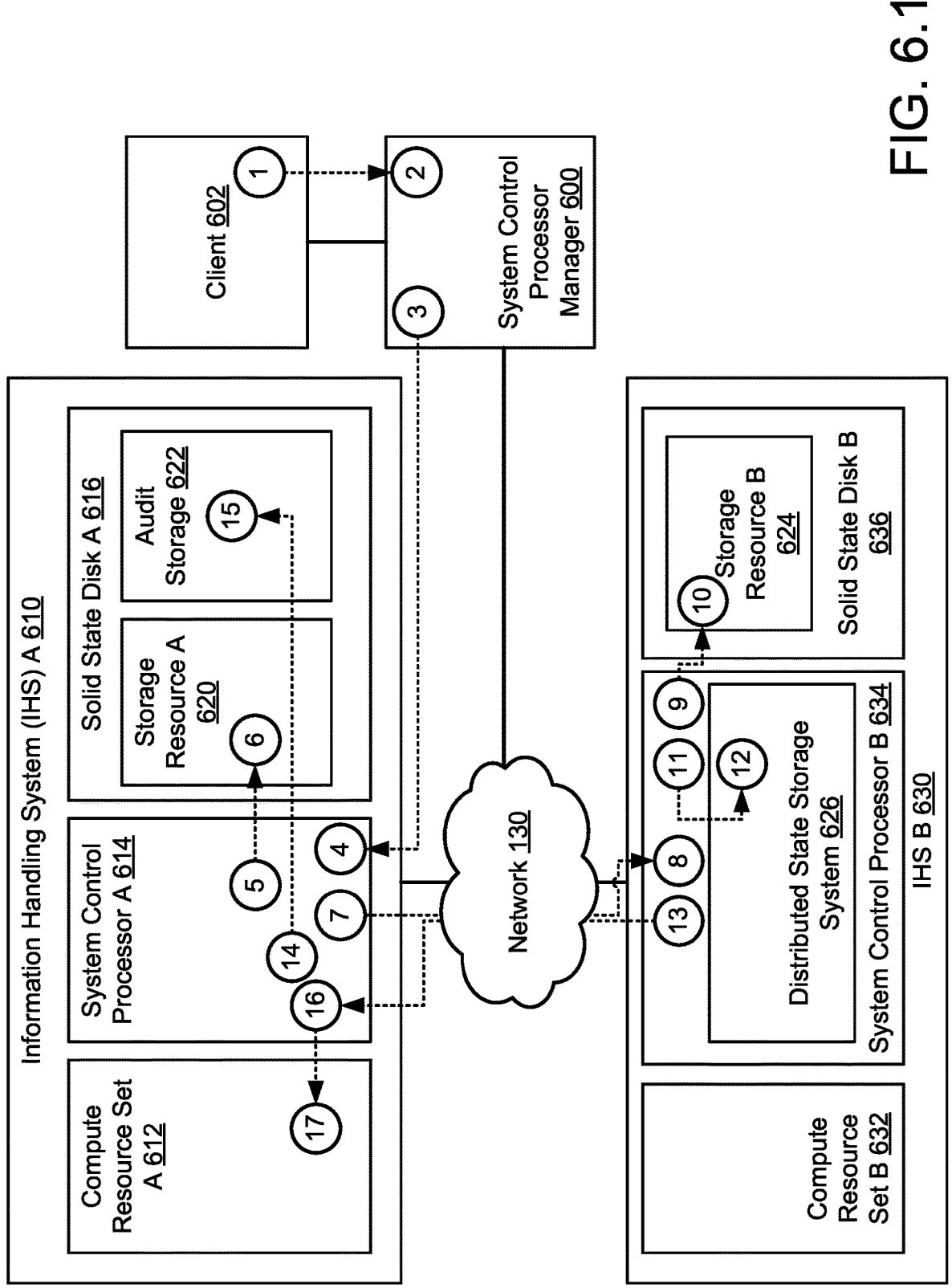
FIG. 6.1

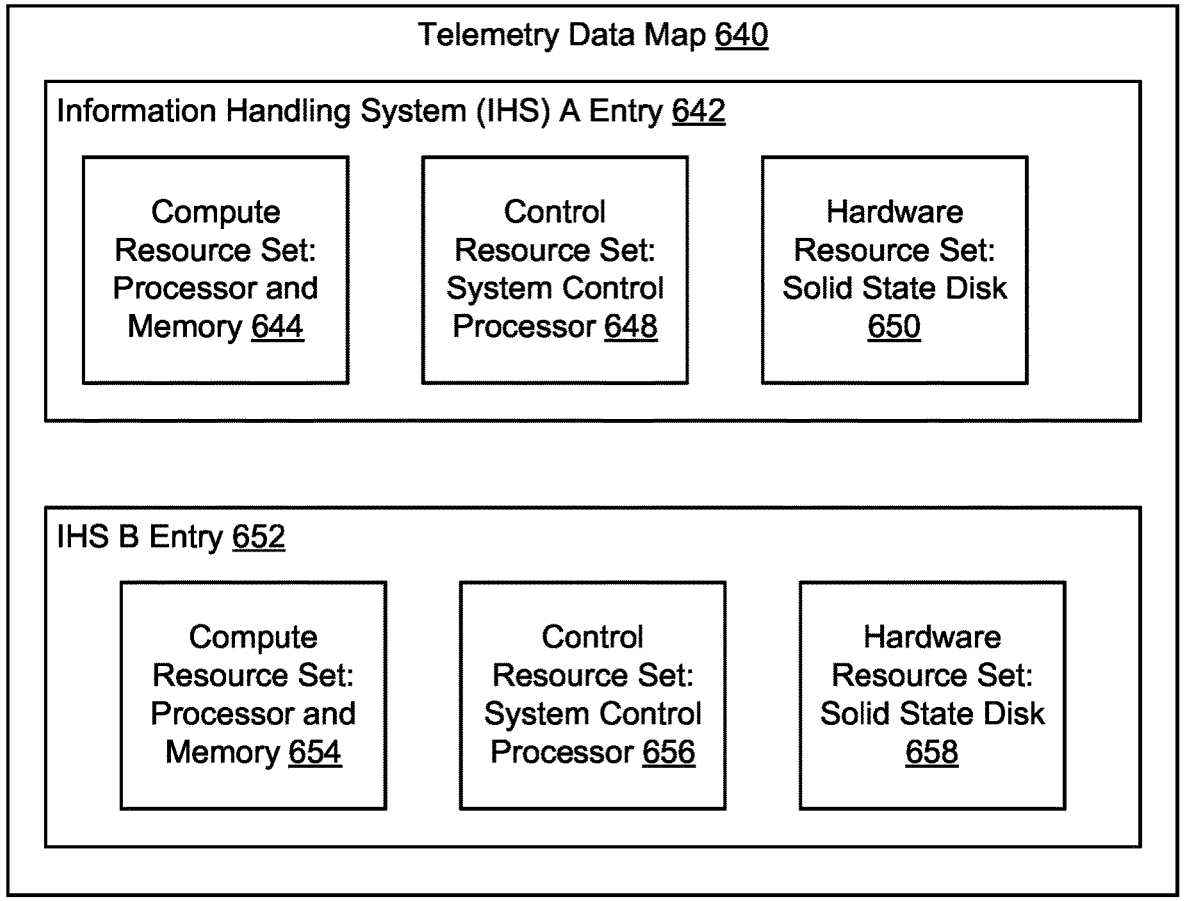
FIG. 6.2

Outcome Based Computing Resource Requirements Lookup Table 660

Database Application Entry 662

Compute Resources: One Processor, One Gigabyte Memory 664

Control Resources: Storage Management 666

Hardware Resources: Two Terabytes of Storage 668

FIG. 6.3

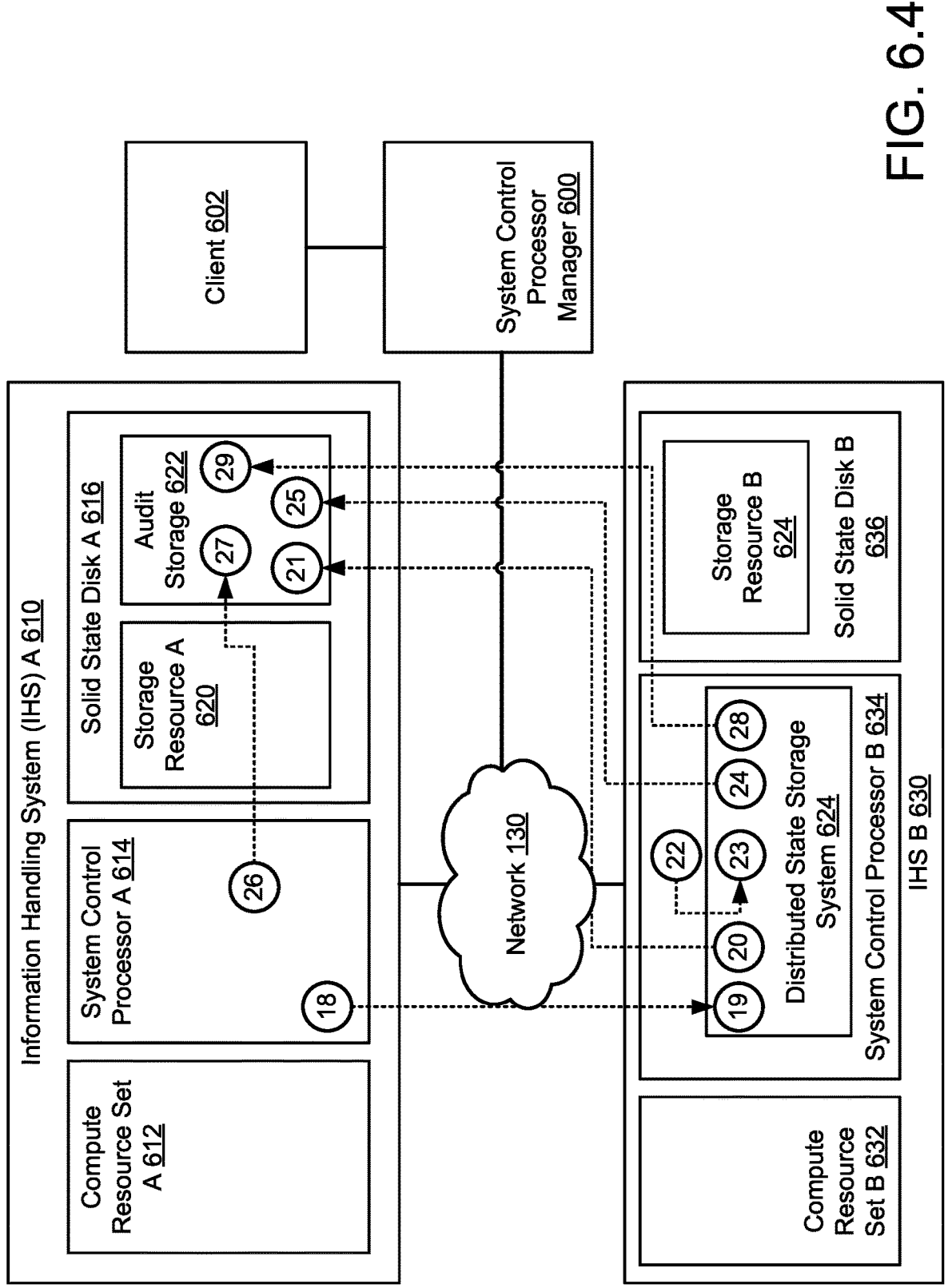
FIG. 6.4

METHOD AND SYSTEM FOR PERFORMING HISTORICAL STATE MANAGEMENT SERVICES FOR COMPOSED INFORMATION HANDLING SYSTEMS

BACKGROUND

Computing devices may provide services. To provide the services, the computing devices may include hardware components and software components. The services provided by the computing devices may be limited by these components. The hardware components and software components may be allocated to provide the services. The state of the allocations may be important for users and/or the protection of the computing devices. The state of the allocations may change over time. The historical states of the allocations may also be important for user and/or the protection of the computing devices.

SUMMARY

In general, certain embodiments described herein relate to a method for performing state management services for composed information handling systems. The method may include making a first determination that at least one control resource set is not associated with a distributed state storage system; and in response to the first determination: identifying first additional computing resources to instantiate the distributed state storage system; instantiating the distributed state storage system using the first additional computing resources; registering the at least one control resource set with the distributed state storage system; preparing the at least one control resource set to perform at least a first portion of the state management services using the distributed state storage system; making a second determination that the at least one control resource set is not associated with an audit storage; and in response to the second determination: identifying second additional computing resources to instantiate the audit storage; instantiating the audit storage using the second additional computing resources; registering the at least one control resource set with the audit storage; and preparing the at least one control resource set to perform at least a second portion of the state management services using the audit storage.

In general, certain embodiments described herein relate to a system for performing state management services for composed information handling systems. The system includes a plurality of information handling systems which include a plurality of system control processors. The system also includes a system control processor manager, which includes a processor and memory, and is programmed to make a first determination that at least one control resource set is not associated with a distributed state storage system; and in response to the first determination: identify first additional computing resources to instantiate the distributed state storage system; instantiate the distributed state storage system using the first additional computing resources; register the at least one control resource set with the distributed state storage system; prepare the at least one control resource set to perform at least a first portion of the state management services using the distributed state storage system; make a second determination that the at least one control resource set is not associated with an audit storage; and in response to the second determination: identify second additional computing resources to instantiate the audit storage; instantiate the audit storage using the second additional computing resources; register the at least one control resource set with the audit storage; and prepare the at least one control resource set to perform at least a second portion of the state management services using the audit storage.

In general, certain embodiments described herein relate to a non-transitory computer readable medium that includes computer readable program code, which when executed by a computer processor enables the computer processor to perform a method for performing state management services for composed information handling systems. The method may include making a first determination that at least one control resource set is not associated with a distributed state storage system; and in response to the first determination: identifying first additional computing resources to instantiate the distributed state storage system; instantiating the distributed state storage system using the first additional computing resources; registering the at least one control resource set with the distributed state storage system; preparing the at least one control resource set to perform at least a first portion of the state management services using the distributed state storage system; making a second determination that the at least one control resource set is not associated with an audit storage; and in response to the second determination: identifying second additional computing resources to instantiate the audit storage; instantiating the audit storage using the second additional computing resources; registering the at least one control resource set with the audit storage; and preparing the at least one control resource set to perform at least a second portion of the state management services using the audit storage.

Other aspects of the embodiments disclosed herein will be apparent from the following description and the appended claims.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 1.1 shows a diagram of a system in accordance with one or more embodiments of the invention.

FIG. 1.2 shows a diagram of an information handling system in accordance with one or more embodiments of the invention.

FIG. 5.1 shows a flowchart of a method for instantiating a composed information handling system based on an intent based data protection request in accordance with one or more embodiments of the invention.

FIGS. 5.2-5.3 show a flowcharts of a method for setting up state management services in accordance with one or more embodiments of the invention.

FIG. 5.4 shows a flowchart of a method for performing state management services in accordance with one or more embodiments of the invention.

FIGS. 6.1-6.4 shows diagrams of the operation of an example system over time in accordance with one or more embodiments of the invention.

DETAILED DESCRIPTION

Figure 2:
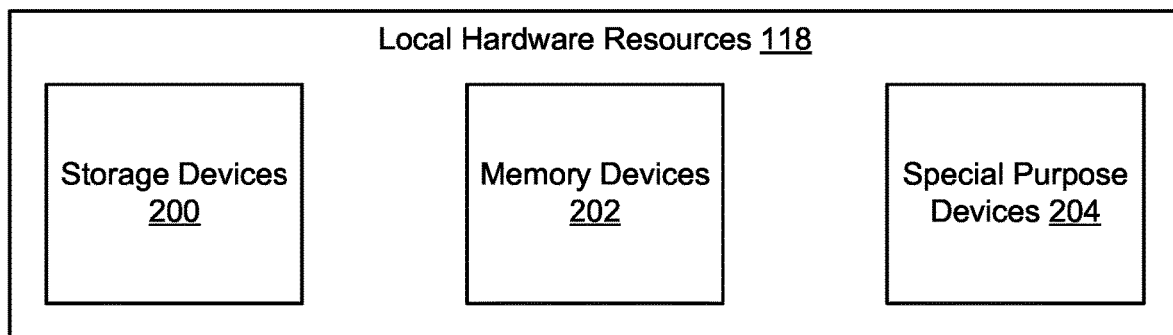
FIG. 2 shows a diagram of local hardware resources in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct connection (e.g., wired directly between two devices or components) or indirect connection (e.g., wired and/or wireless connections between any number of devices or components connecting the operatively connected devices). Thus, any path through which information may travel may be considered an operative connection.

In general, embodiments of the invention relate to methods, systems, and non-transitory computer readable mediums for performing historical state management services for composed information handling systems.

In one or more embodiments of the invention, composed information handling system are composed to perform computer implemented services. A composed information handling system may be a device (the components of which may be distributed across one or more information handling systems) that has exclusive use over a quantity of computing resources. Computing resources from multiple information handling systems may be allocated to a composed information handling system thereby enabling a composed information handling system to utilize computing resources from any number of information handling system for performance of corresponding computer implemented services.

To allocate computing resources, the system may include a system control processor manager. The system control processor manager may obtain composition requests. The composition requests may indicate a desired outcome such as, for example, execution of one or more applications, providing of one or more services, etc. The system control processor manager may translate the composition requests into corresponding quantities of computing resources necessary to be allocated to satisfy the intent of the composition requests.

The state (i.e., the allocation of computing resources that make up a composed information handling system) of composed information handling systems may be critical for maintaining composed information handling systems and restoring management entities of composed information handling systems such as the system control processor manager. The state of a composed information handling system may change over time as the composed information handling system is re-composed. The previous states may also be important for maintaining composed information handling systems. The previous states may be used to perform point-in-time restorations of composed information handling systems and management entities such as system control processor managers. Additionally, by maintaining the previous states, a user of the system may obtain a historical view of a composed information handling system over time. To maintain and ensure the availability of the current state and previous states of composed information handling systems, the system control processor managers may instruct system control processors to perform state management services using a distributed state storage system and an audit storage.

In one or more embodiments of the invention, the state management services performed by the system control processors include generating state information associated with each system control processor and storing the state information in the distributed state storage system for each composition or re-composition of the composed information handling systems. The state information may specify the computing resources managed by the system control processors that are allocated to composed information handling systems, and the computing resources managed by the system control processors that are not allocated to composed information handling systems at the point-in-time in which the composed information handling system was composed or re-composed. The state information generated by each system control processor may collectively specify the state of all composed information handling systems as well as available computing resources to be allocated to composed information handling systems.

In one or more embodiments of the invention, the state management services further include storing previous state information in an audit storage. The previous state information may be stored in the audit storage as a directed acyclic graph. Additionally, system control processors may perform audit storage verification to validate previous state information of other system control processors and build trust between the system control processors.

In one or more embodiments of the invention, the distributed state storage system and the audit storage are both accessible by each system control processor in the system. The distributed state storage system and the audit storage may be implemented as distributed file systems (e.g., peer-to-peer file systems). The audit storage may include additional persistent storage capacity in order to store any quantity of previous state information. As a result, the current state information and past state information associated with each system control processor may be shared across all system control processors using the distributed state storage system and the audit storage, thereby increasing the availability and reliability of the current and previous state information.

FIG. 1.1 shows a system in accordance with one or more embodiments of the invention. The system may include any number of information handling systems (60). The information handling systems (60) may provide computer implemented services. The computer implemented services may include, for example, database services, data storage services, electronic communications services, data protection services, and/or other types of services that may be implemented using information handling systems.

The information handling system of the system of FIG. 1.1 may operate independently and/or cooperatively to provide the computer implemented services. For example, a single information handling system (e.g., 62) may provide a computer implemented service on its own (i.e., independently) while multiple other information handling systems (e.g., 62, 64) may provide a second computer implemented service cooperatively (e.g., each of the multiple other information handling systems may provide similar and or different services that form the cooperatively provided service).

To provide computer implemented services, the information handling systems (60) may utilize computing resources provided by hardware devices. The computing resources may include, for example, processing resources, storage resources, memory resources, graphics processing resources, communications resources, and/or other types of resources provided by the hardware devices. Various hardware devices may provide these computing resources.

As discussed above, embodiments of the invention relate to system, methods, and devices for managing the hardware resources of the information handling systems (60) and/or other resources (e.g., external resources (30)) to provide state management services for composed information handling systems and the information handling systems (60). The hardware resources of the information handling systems (60) may be managed by instantiating one or more composed information handling systems using the hardware resources of the information handling systems (60), external resources (30), and/or other types of hardware devices operatively connected to the information handling systems (60). During the instantiation of the composed information handling systems, one or more devices, including a system control processor, a distributed state storage system, and an audit storage (all not shown in FIG. 1.1), may be automatically setup to perform state management services for the composed information handling system, including: (i) generating and storing current state information associated with the composed information handling systems and/or the information handling systems (60) in the distributed state storage system, (ii) storing previous state information in the audit storage as a directed acyclic graph, and (iii) performing audit storage verification to validate previous state information stored in the audit storage by other system control processors. Consequently, current state information specifying the state of the system may be persisted in the distributed state storage system and previous state information may be persisted in the audit storage. Such current and previous state information may be used to perform restorations, point-in-time restorations of the system control processor manager (50) and/or to re-compose composed information handling systems, and to provide a historical representation of composed information handling systems.

In one or more embodiments of the invention, the system includes a system control processor manager (50). The system control processor manager (50) may provide composed information handling system composition services. Composed information handling system composition services may include (i) obtaining composition requests for composed information handling systems and (ii) aggregating computing resources from the information handling systems (60) and/or external resources (30) using system control processors to service the composition requests by instantiating composed information handling systems in accordance with the requests. By doing so, instantiated composed information handling systems may provide computer implemented services in accordance with the composition requests.

In one or more embodiments of the invention, the system control processor manager (50) instantiates composed information handling systems in accordance with a three resource set model. As will be discussed in greater detail below, the computing resources of an information handling system may be divided into three logical resource sets: a compute resource set, a control resource set, and a hardware resource set. Different resource sets, or portions thereof, from the same or different information handling systems may be aggregated (e.g., caused to operate as a computing device) to instantiate a composed information handling system having at least one resource set from each set of the three resource set model.

By logically dividing the computing resources of an information handling system into these resource sets, different quantities an types of computing resources may be allocated to each composed information handling system thereby enabling the resources allocated to the respective information handling system to match performed workloads. Further, dividing the computing resources in accordance with the three set model may enable different resource sets to be differentiated (e.g., given different personalities) to provide different functionalities. Consequently, composed information handling systems may be composed on the basis of desired functionalities rather than just on the basis of aggregate resources to be included in the composed information handling system.

Additionally, by composing composed information handling systems in this manner, the control resource set of each composed information handling system may be used to consistently deploy management services across any number of composed information handling systems. Consequently, embodiments of the invention may provide a framework for unified security, manageability, resource management/composability, workload management, and distributed system management by use of this three resource set model. For additional details regarding the system control processor manager (50), refer to FIG. 4.

In one or more embodiments of the invention, the system control processor manager (50) composes a distributed state storage system (not shown) for composed information handling systems. The system control processors and the system control processor manager (50) (discussed below) may use the distributed state storage system to provide a portion of the state management services for composed information handling systems.

In one or more embodiments of the invention, the distributed state storage system includes the functionality to store state information. The state information may include current state information and/or previous state information. The distributed state storage system may store other and/or additional information without departing from the invention. The distributed state storage system may include a limited amount of storage capacity. Therefore, the system control processors may offload previous state information to the audit storage (discussed below). The distributed state storage system may be accessible by the system control processors of the information handling systems (60). In other words, a system control processor may: (i) store present and/or previous state information associated with, and generated by, the system control processor in the distributed state storage system and (ii) the system control processor may obtain state information associated with the system control processor and/or other system control processors from the distributed state storage system. The distributed state storage system may include other and/or additional functionality without departing from the invention.

In one or more embodiments of the invention, the distributed state storage system is implemented as a peer-to-peer file system between the system control processors of the information handling systems (60). The system control processors may be connected using any appropriate peer-to-peer file sharing technology or protocol (e.g., BitTorrent, Direct Connect, IPFS, etc.) without departing from the invention. For example, to implement the distributed state storage system, the system control processors may include and/or be operatively connected to storage devices in which state information is stored. The system control processors may include, for example, a file sharing application, which when executed by the system control processors, obtains and shares state information between the system control processors via a network (e.g., 130). The distributed state storage system may be implemented using any appropriate distributed and/or shared storage system without departing from the invention.

In one or more embodiments of the invention, the system control processor manager (50) composes an audit storage (not shown) for composed information handling systems. The system control processors and the system control processor manager (50) (discussed below) may use the audit storage to provide a portion of the state management services for composed information handling systems.

In one or more embodiments of the invention, the audit storage includes the functionality to store previous state information. The audit storage may store other and/or additional information without departing from the invention. The audit storage may include a higher amount of storage capacity compared to the distributed state storage system. Therefore, the system control processors may offload previous state information from the distributed state storage system to the audit storage as discussed above. The audit storage may be accessible by the system control processors of the information handling systems (60). In other words, a system control processor may: (i) store previous state information associated with and generated by the system control processor in the audit storage and (ii) the system control processor may obtain previous state information associated with the system control processor and/or other system control processors from the audit storage. The audit storage may include other and/or additional functionality without departing from the invention.

In one or more embodiments of the invention, the previous state information is stored in the audit storage as a directed acyclic graph. In other words, the previous state information for a system control processor may be associated with a topological order based on the point in time in which previous state information is generated. For example, first previous state information generated may be associated with a higher topological order position in the directed acyclic graph than second previous state information generated after the first previous state information. As a result, the directed acyclic graph may enable a user to obtain a complete historical view of previous state information associated with a system control processor.

In one or more embodiments of the invention, the audit storage is implemented as a peer-to-peer file system between the system control processors of the information handling systems (60). The system control processors may be connected using any appropriate peer-to-peer file sharing technology or protocol (e.g., BitTorrent, Direct Connect, IPFS, etc.) without departing from the invention. For example, to implement the audit storage, the system control processors may include and/or be operatively connected to storage devices in which state information is stored. The system control processors may include, for example, a file sharing application, which when executed by the system control processors, obtains and shares state information between the system control processors via a network (e.g., 130). The audit storage may be implemented using any appropriate distributed and/or shared storage system without departing from the invention.

In one or more embodiments of the invention, a composed information handling system is a device that is formed using all, or a portion, of the computing resources of the information handling systems (60), the external resources (30), and/or other types of hardware devices operatively connected to the information handling systems (60). The composed information handling system may utilize the computing resources allocated to it to provide computer implemented services. For example, the composed information handling system may host one or more applications that utilize the computing resources assigned to the composed information handling system. The applications may provide the computer implemented services.

To instantiate composed information handling systems, the information handling systems (60) may include at least three resource sets including a control resource set. The control resource set may include a system control processor. The system control processor of each information handling system may coordinate with the system control processor manager (50) to enable composed information handling systems to be instantiated. For example, the system control processor of an information handling system may provide telemetry data regarding the computing resources of an information handling system, may perform actions on behalf of the system control processor manager (50) to aggregate computing resources together, may organize the performance of duplicative workloads to improve the likelihood that workloads are completed, and/or may provide services that unify the operation of composed information handling systems.

In one or more embodiments of the invention, compute resource sets of composed information handling systems are presented with bare metal resources by control resource sets even when the presented resources are actually being managed using one or more layers of abstraction, emulation, virtualization, security model, etc. For example, the system control processors of the control resource sets may provide the abstraction, emulation, virtualization, data protection, and/or other services while presenting the resources as bare metal resources. Consequently, these services may be transparent to applications hosted by the compute resource sets of composed information handling systems thereby enabling uniform deployment of such services without requiring implementation of control plane entities hosted by the compute resource sets of the composed information handling systems. For additional details regarding the information handling systems (60), refer to FIG. 1.2.

The external resources (30) may provide computing resources that may be allocated for use by composed information handling systems. For example, the external resources (30) may include hardware devices that provide any number and type of computing resources. The composed information handling system may use these resource to provide their functionalities. Different external resources (e.g., 32, 34) may provide similar or different computing resources.

In one or more embodiments of the invention, the system of FIG. 1.1 includes backup storages (70) that provide data storage services to the composed information handling systems. The backup storages (70) may include any number of backup storages, for example, the backup storages (70) may include backup storage A (72) and backup storage N (74). The data storage services may include storing of data provided by the composed information handling systems and providing previously stored data to the composed information handling systems. The data stored in backup storages (70) may be used for restoration purposes. The data stored in the backup storages (70) may be used for other purposes without departing from the invention. The data stored in backup storages (70) may include backups generated during the performance of data protection services of the composed information handling systems. The backups may be any type of backup (e.g., snapshot, incremental backup, full backup, etc.) without departing from the invention. The data stored in backup storages (70) may include other and/or additional types of data obtained from other and/or additional components without departing from the invention.

The system of FIG. 1.1 may include any number of information handling systems (e.g., 62, 64), any number of external resources (e.g., 32, 34), any number of backup storages (e.g., 72, 74), and any number of system control processor managers (e.g., 50). Any of the components of FIG. 1.1 may be operatively connected to any other component and/or other components not illustrated in FIG. 1.1 via one or more networks (e.g., 130). The networks may be implemented using any combination of wired and/or wireless network topologies.

The system control processor manager (50), information handling systems (60), backup storages (70), and/or external resources (30) may be implemented using computing devices. The computing devices may include, for example, a server, laptop computer, a desktop computer, a node of a distributed system, etc. The computing device may include one or more processors, memory (e.g., random access memory), and/or persistent storage (e.g., disk drives, solid state drives, etc.). The persistent storage may store computer instructions, e.g., computer code, that (when executed by the processor(s) of the computing device) cause the computing device to perform the functions of the system control processor manager (50), information handling systems (60), backup storages (70), and/or external resources (30) described in this application and/or all, or a portion, of the methods illustrated in FIGS. 5.1-5.4. The system control processor manager (50), information handling systems (60), backup storages (70), and/or external resources (30) may be implemented using other types of computing devices without departing from the invention. For additional details regarding computing devices, refer to FIG. 7.

While the system has been illustrated and described as including a limited number of specific components, a system in accordance with embodiments of the invention may include additional, fewer, and/or different components without departing from the invention.

Turning to FIG. 1.2, FIG. 1.2 shows a diagram of an information handling system (100) in accordance with one or more embodiments of the invention. Any of the information handling systems (e.g., 60) of FIG. 1.1 may be similar to the information handling system (100) illustrated in FIG. 1.2.

As discussed above, the information handling system (100) may provide any quantity and type of computer implemented services. To provide the computer implemented services, resources of the information handling system may be used to instantiate one or more composed information handling systems. The composed information handling systems may provide the computer implemented services.

To provide computer implemented services, the information handling system (100) may include any number and type of hardware devices including, for example, one or more processors (106), any quantity and type of processor dedicated memory (104), one or more system control processors (114), and any number of hardware resources (118). These hardware devices may be logically divided into three resource sets including a compute resource set (102), a control resource set (108), and a hardware resource set (110).

The control resource set (108) of the information handling system (100) may facilitate formation of composed information handling systems and perform state management services using the distributed state storage system and the audit storage. To do so, the control resource set (108) may prepare any quantity of resources from any number of hardware resource sets (e.g., 110) (e.g., of the information handling system (100) and/or other information handling systems) for presentation to processing resources of any number of computing resource sets (e.g., 102) (e.g., of the information handling system (100) and/or other information handling systems). Once prepared, the control resource set (108) may present the prepared resources as bare metal resources to the processors (e.g., 106) of the allocated computing resources. By doing so, a composed information handling system may be instantiated. Additionally, the control resource set (108) may prepare hardware resource sets (e.g., 110) or other computer resources (e.g., system control processors (114)) to implement a distributed state storage system and an audit storage, and perform state management services.

To prepare the resources of the hardware resource sets for presentation, the control resource set (108) may employ, for example, virtualization, indirection, abstraction, and/or emulation. These management functionalities may be transparent to applications hosted by the resulting instantiated composed information handling systems. Consequently, while unknown to the control plane entities of the composed information handling system, the composed information handling system may operate in accordance with any number of management models thereby providing for unified control and management of composed information handling systems. These functionalities may be transparent to applications hosted by composed information handling systems thereby relieving them from overhead associated with these functionalities.

For example, consider a scenario where a compute resource set is instructed to instantiate a composed information handling system including a compute resource set and a hardware resource set that will contribute storage resources to the compute resource set. The compute resource set may virtualize the storage resources of the hardware resource set to enable a select quantity of the storage resources to be allocated to the composed information handling system while reserving some of the storage resources for allocation to other composed information handling systems. However, the prepared storage resources may be presented to the compute resource set as bare metal resources. Consequently, the compute resource set may not need to host any control plane entities or otherwise incur overhead for utilizing the virtualized storage resources.

The compute resource set (102) may include one or more processors (106) operatively connected to the processor dedicated memory (104). Consequently, the compute resource set (102) may host any number of executing processes thereby enabling any number and type of workloads to be performed. When performing the workloads, the compute resource set (102) may utilize computing resources provided by the hardware resource set (110) of the information handling system (100), hardware resource sets of other information handling systems, and/or external resources.

The processors (106) of the compute resource set (102) may be operatively connected to one or more system control processors (114) of the control resource set (108). For example, the processors (106) may be connected to a compute resource interface (112), which is also connected to the system control processors (114).

The system control processors (114) of the control resource set (108) may present computing resources to the processors (106) as bare metal resources. In other words, from the point of view of the processors (106), any number of bare metal resources may be operatively connected to it via the compute resources interface (112) when, in reality, the system control processors (114) are operatively connected to the processors (106) via the compute resources interface (112). In other words, the system control processors (114) may manage presentation of other types of resources to the compute resource set (102).

By presenting the computing resources to the processors as bare metal resources, control plane entities (e.g., applications) such as hypervisors, emulators, and/or other types of management entities may not need to be hosted (e.g., executed) by the processors (106) for the processors (106) and entities hosted by them to utilize the computing resources allocated to a composed information handling system. Accordingly, all of the processing resources provided by the compute resource set (102) may be dedicated to providing the computer implemented services.

For example, the processors (106) may utilize mapped memory addresses to communicate with the bare metal resources presented by the system control processors (114) to the processors (106). The system control processors (114) may obtain these communications and appropriately remap (e.g., repackage, redirect, encapsulate, etc.) the communications to the actual hardware devices providing the computing resources, which the processors (106) are interacting with via the compute resources interface (112) and/or hardware resources interface (116), discussed below. Consequently, indirection, remapping, and/or other functions required for resource virtualization, emulation, abstraction, or other methods of resource allocation (other than bare metal) and manage may not need to be implemented via the processors (106).

By doing so, any number of functions for a composed information handling system may be automatically performed in a manner that is transparent to the control plane. Accordingly, a composed information handling system may operate in a manner consistent with a unified, consistent architecture or model (e.g., communications model, data storage model, etc.) by configuring the operation of one or more system control processors in a manner consistent with the architecture or model.

In one or more embodiments of the invention, control plane entities utilize computing resources presented through one or more layers of indirection, abstraction, virtualization, etc. In other words, an indirect user of hardware devices and computing resources provided thereby.

In one or more embodiments of the invention, data plane entities directly utilize computing resources. For example, data plane entities may instruct hardware devices on their operation thereby directly utilizing computing resources provided thereby. Data plane entities may present the computing resources to control plane entities using one or more layers of indirection, abstraction, virtualization, etc.

The system control processors (114) may present any number of resources operatively connected to it (e.g., the hardware resource set (110), other resources operatively connected to it via an interface (e.g., hardware resources interface (116), etc.) as bare metal resources to the processors (106) of the compute resource set (102). Consequently, the system control processors (114) may implement device discovery processes compatible with the processors (106) to enable the processors (106) to utilize the presented computing resources.

For example, the hardware resource set (110) may include hardware resources (118) operatively connected to the system control processors (114) via a hardware resources interface (116). The hardware resources (118) may include any number and type of hardware devices that provide computing resources. For additional details regarding the hardware resources (118), refer to FIG. 2.

In another example, the system control processors (114) may be operatively connected to other hardware resource sets of other information handling systems via hardware resources interface (116), network (130), and/or other system control processors of the other information handling systems. The system control processors (114) may cooperatively enable hardware resource sets of other information handling systems to be prepared and presented as bare metal resources to the compute resource set (102).

In an additional example, the system control processors (114) may be operatively connected to external resources via hardware resources interface (116) and network (130). The system control processors (114) may prepare and present the external resources as bare metal resources to the compute resource set (102).

Figure 3:
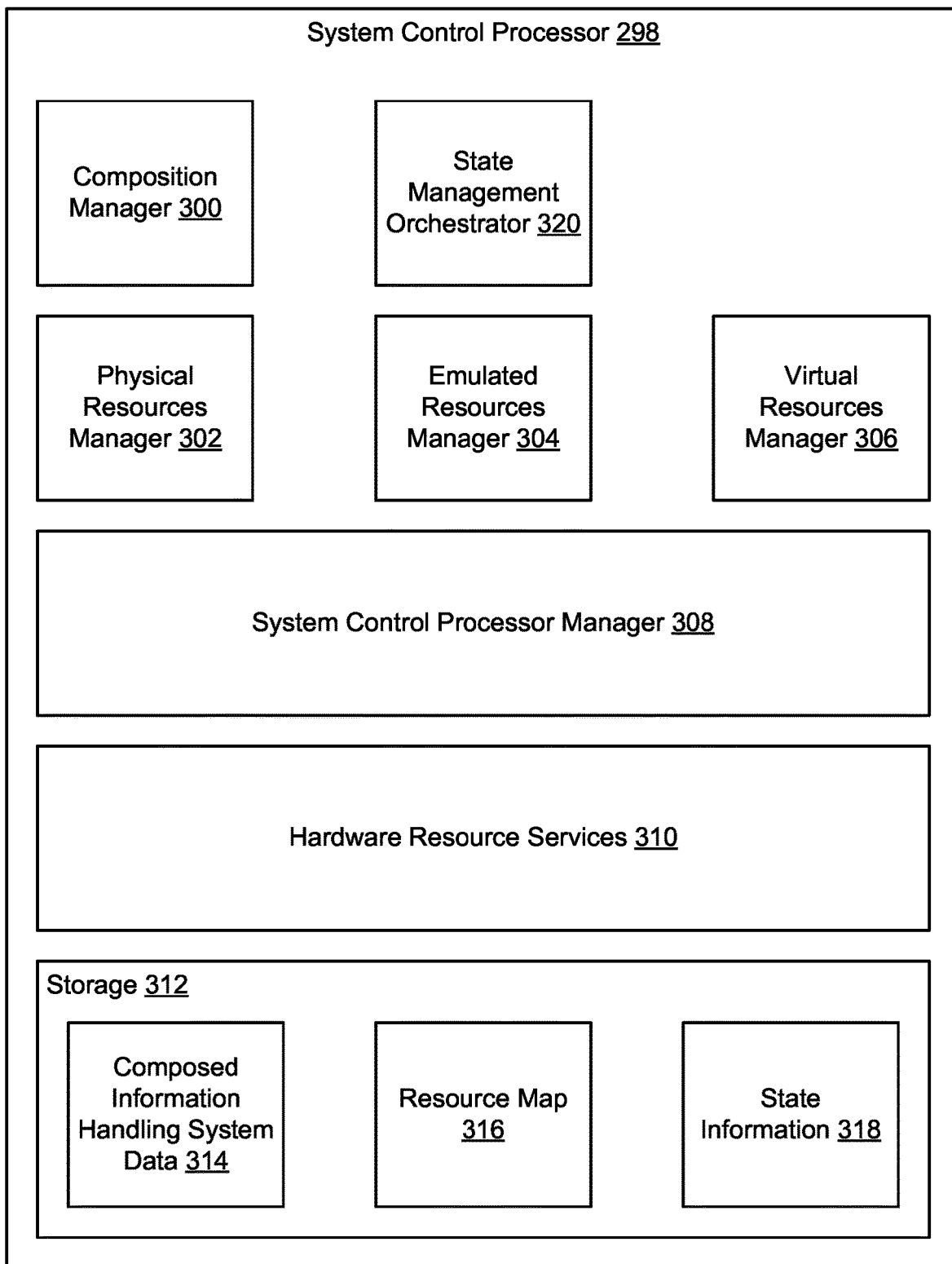
FIG. 3 shows a diagram of a system control processor in accordance with one or more embodiments of the invention.

For additional details regarding the operation and functions of the system control processors (114), refer to FIG. 3.

The compute resources interface (112) may be implemented using any suitable interconnection technology including, for example, system buses such as compute express links or other interconnection protocols. The compute resources interface (112) may support any input/output (10) protocol, any memory protocol, any coherence interface, etc. The compute resources interface (112) may support processor to device connections, processor to memory connections, and/or other types of connections. The compute resources interface (112) may be implemented using one or more hardware devices including circuitry adapted to provide the functionality of the compute resources interface (112).

The hardware resources interface (116) may be implemented using any suitable interconnection technology including, for example, system buses such as compute express links or other interconnection protocols. The hardware resources interface (116) may support any input/output (TO) protocol, any memory protocol, any coherence interface, etc. The hardware resources interface (116) may support processor to device connections, processor to memory connections, and/or other types of connections. The hardware resources interface (116) may be implemented using one or more hardware devices including circuitry adapted to provide the functionality of the hardware resources interface (116).

In some embodiments of the invention, the compute resource set (102), control resource set (108), and/or hardware resource set (110) may be implemented as separate physical devices. In such a scenario, the compute resources interface (112) and hardware resources interface (116) may include one or more networks enabling these resource sets to communicate with one another. Consequently, any of these resource sets (e.g., 102, 108, 110) may include network interface cards or other devices to enable the hardware devices of the respective resource sets to communicate with each other.

In one or more embodiments of the invention, the system control processors (114) support multiple, independent connections. For example, the system control processors (114) may support a first network communications connection (e.g., an in-band connection) that may be allocated for use by applications hosted by the processors (106). The system control processors (114) may also support a second network communications connection (e.g., an out-of-band connection) that may be allocated for use by applications hosted by the system control processors (114). The out-of-ban connection may be utilized for management and control purposes while the in-band connection may be utilized to provide computer implemented services. These connections may be associated with different network endpoints thereby enabling communications to be selectively directed toward applications hosted by the processors (106) and/or system control processors (114). As will be discussed in greater detail with respect to FIG. 3, the system control processors (114) may utilize the out-of-band connections to communicate with other devices to manage (e.g., instantiate, monitor, modify, etc.) composed information handling systems.

The network (130) may correspond to any type of network and may be operatively connected to the Internet or other networks thereby enabling the information handling system (100) to communicate with any number and type of other devices.

The information handling system (100) may be implemented using computing devices. The computing devices may be, for example, a server, laptop computer, desktop computer, node of a distributed system, etc. The computing device may include one or more processors, memory (e.g., random access memory), and/or persistent storage (e.g., disk drives, solid state drives, etc.). The persistent storage may store computer instructions, e.g., computer code, that (when executed by the processor(s) of the computing device) cause the computing device to perform the functions of the information handling system (100) described in this application and/or all, or a portion, of the methods illustrated in FIGS. 5.1-5.4. The information handling system (100) may be implemented using other types of computing devices without departing from the invention. For additional details regarding computing devices, refer to FIG. 7.

While the information handling system (100) has been illustrated and described as including a limited number of specific components, an information handling system in accordance with embodiments of the invention may include additional, fewer, and/or different components without departing from the invention.

Turning to FIG. 2, FIG. 2 shows a diagram of the hardware resources (118) in accordance with one or more embodiments of the invention. As noted above, system control processors of information handling system may present resources including, for example, any portion of the hardware resources (118) to form a composed information handling system.

The hardware resources (118) may include any number and types of hardware devices that may provide any quantity and type of computing resources. For example, the hardware resources (118) may include storage devices (200), memory devices (202), and special purpose devices (204).

The storage devices (200) may provide storage resources (e.g., persistent storage) in which applications hosted by a composed information handling system may store data including any type and quantity of information. The system control processors or other entities may write data chunks to the storage devices (200). The storage devices (200) may include any type and quantity of devices for storing data. The devices may include, for example, hard disk drives, solid state drives, tape drives, etc. The storage devices (200) may include other types of devices for providing storages resources without departing from the invention. For example, the storage devices (200) may include controllers (e.g., redundant array of disk controllers), load balancers, and/or other types of devices.

The memory devices (202) may provide memory resources (e.g., transitory and/or persistent storage) in which a composed information handling system may store data including any type and quantity of information. The memory devices (202) may include any type and quantity of devices for storing data. The devices may include, for example, transitory memory such as random access memory, persistent memory such as enterprise class memory, etc. The memory devices (202) may include other types of devices for providing memory resources without departing from the invention. For example, the storage devices (200) may include controllers (e.g., replication managers), load balancers, and/or other types of devices.

The special purpose devices (204) may provide other types of computing resources (e.g., graphics processing resources, computation acceleration resources, etc.) to composed information handling systems. The special purpose devices (204) may include any type and quantity of devices for providing other types of computing resources. The special purpose devices (204) may include, for example, graphics processing units for providing graphics processing resources, compute accelerators for accelerating corresponding workloads performed by composed information handling systems, application specific integrated circuits (ASICs) for performing other functionalities, digital signal processors for facilitating high speed communications, etc. The special purpose devices (204) may include other types of devices for providing other types of computing resources without departing from the invention.

The system control processors of the information handling systems may mediate presentation of the computing resources provided by the hardware resources (118) to computing resource sets (e.g., as bare metal resources to processors). When doing so, the system control processors may provide a layer of abstraction that enables the hardware resources (118) to be, for example, virtualized, emulated as being compatible with other systems, and/or directly connected to the compute resource sets (e.g., pass through). Consequently, the computing resources of the hardware resources (118) may be finely, or at a macro level, allocated to different composed information handling systems.

Additionally, the system control processors may manage operation of these hardware devices in accordance with one or more models, including state management models. The models may include other models such as, for example, security models, workload performance availability models, reporting models, etc. The state management models may include performing state management services for data generated by the composed information handling system. The state management services may include: (i) generating, by the system control processors, present state information, (ii) storing the present state information in the distributed state storage system, (iii) storing previous state information in the audit storage, and (iv) performing audit storage verification. The state management services may include other and/or additional services without departing from the invention. For additional information regarding the performance of state management services, refer to FIGS. 5.2-5.4.

To perform the aforementioned state management services, during the instantiation of a composed information handling system, the system control processor manager may prepare one or more system control processors and/or hardware resources to be used to provide the state management services. The system control processor manager may instruct the one or more system control processors to perform the state management services using the distributed state storage system and the audit storage.

The manner of operation of these devices (i.e., the performance of the aforementioned state management services) may be transparent to the computing resource sets utilizing the hardware devices for providing computer implemented services. Consequently, even though the resulting composed information handling system control plane may be unaware of the implementation of these models, the composed information handling systems may still operate in accordance with these models thereby providing a unified method of performing the state management services for composed information handling systems.

While the hardware resources (118) have been illustrated and described as including a limited number of specific components, hardware resources (118) in accordance with embodiments of the invention may include additional, fewer, and/or different components without departing from the invention.

As discussed above, information handling systems may include system control processors that may be used to instantiate composed information handling systems. FIG. 3 shows a diagram of a system control processor (298) in accordance with one or more embodiments of the invention. Any of the system control processors included in control resources sets of FIG. 1.2 may be similar to the system control processor (298) illustrated in FIG. 3.

The system control processor (298) may facilitate instantiation and operation of composed information handling systems. By doing so, a system that includes information handling systems may dynamically instantiate composed information handling systems to provide computer implemented services and to provide state management services for the composed information handling system.

To instantiate and operate composed information handling systems, the system control processor (298) may include a composition manager (300), a physical resources manager (302), an emulated resources manager (304), a virtual resources manager (306), a state management orchestrator (320), a system control processor manager (308), hardware resource services (310), and storage (312). Each of these components of the system control processor is discussed below.

The composition manager (300) may manage the process of instantiating and operating composed information handling systems. To provide these management services, the composition manager (300) may include functionality to (i) obtain information regarding the hardware components of the information handling system (e.g., obtain telemetry data regarding the information handling system), (ii) provide the obtained information to other entities (e.g., management entities such as system control processor manager (50, FIG. 1.1)), (iii) obtain composition requests for composed information handling systems, (iv) based on the composition requests, prepare and present resources as bare metal resources to compute resource sets, (v) instantiate applications in composed information handling systems to cause the composed information handling systems to provide computer implemented services, conform their operation to security models, etc., (vi) add/remove/modify resources presented to the compute resource sets of composed information handling systems dynamically in accordance with workloads being performed by the composed information handling systems, and/or (vii) coordinate with other system control processors to provide distributed system functionalities. By providing the above functionalities, a system control processor in accordance with one or more embodiments of the invention may enable distributed resources from any number of information handling systems to be aggregated into a composed information handling system to provide computer implemented services.

To obtain information regarding the hardware components of the information handling system, the composition manager (300) may inventory the components of the information handling system hosting the system control processor. The inventory may include, for example, the type and model of each hardware component, versions of firmware or other code executing on the hardware components, and/or other information regarding hardware components of the information handling system that may be allocated to form composed information handling systems.

The composition manager (300) may obtain composition requests from other entities (e.g., management entities tasked with instantiating composed information handling systems) as pre-loaded instructions present in storage of the system control processor, and/or via other methods. The composition requests may specify, for example, the types and quantities of computing resources to be allocated to a composed information handling system.

In one or more embodiments of the invention, the composition requests specify the computing resource allocations using an intent based model. For example, rather than specifying specific hardware devices (or portions thereof) to be allocated to a particular compute resource set to obtain a composed information handling system, the resource requests may only specify that a composed information handling system is to be instantiated having predetermined characteristics, that a composed information handling system will perform certain workloads or execute certain applications, and/or that the composed information handling system be able to perform one or more predetermined functionalities. In such a scenario, the composition manager may decide how to instantiate the composed information handling system (e.g., which resources to allocate, how to allocate the resources (e.g., virtualization, emulation, redundant workload performance, data integrity models to employ, etc.), to which compute resource set(s) to present corresponding computing resources, etc.).

In one or more embodiments of the invention, the composition requests specify the computing resource allocations using an explicit model. For example, the composition requests may specify (i) the resources to be allocated, (ii) the manner of presentation of those resources (e.g., emulating a particular type of device using a virtualized resource vs. path through directly to a hardware component), and (iii) the compute resource set(s) to which each of the allocated resources are to be presented.

In addition to specifying resource allocations, the composition requests may also specify, for example, applications to be hosted by the composed information handling systems (including a distributed state storage system and an audit storage), security models to be employed by the composed information handling systems, communication models to be employed by the composed information handling systems, data protection services to be provided to the composed information handling systems, user/entity access credentials for use of the composed information handling systems, and/or other information usable to place the composed information handling systems into states in which the composed information handling systems provide desired computer implemented services.

To prepare and present resources to compute resource sets based on the composition requests, the system control processors may implement, for example, abstraction, indirection, virtualization, mapping, emulation, and/or other types of services that may be used to present any type of resources as a resource that is capable of bare metal utilization by compute resource sets. To provide these services, the composition manager (300) may invoke the functionality of the physical resources manager (302), the emulated resources manager (304), and/or the virtual resources manager (306).

Additionally, the system control processors may take into account an importance of completion of workloads when preparing and presenting resources. For example, some workloads that may be performed by various hardware devices may be critical (e.g., high availability workloads) to the computer implemented services to be provided by a composed information handling system. In such a scenario, the system control processor may over allocate resources (e.g., beyond that requested by a compute resource set) for performance of the workloads so that at least two instances of the workloads can be performed using duplicative resources. By doing so, it may be more likely that at least one of the workloads will be completed successfully. Consequently, the system control processor may provide the output of one of the workloads to compute resource sets of a composed information handling system.

When presenting the resources to the compute resource sets, the system control processor (298) may present the resources using an emulated data plane. For example, the system control processors (298) may receive bare metal communications (e.g., IO from the processors) and respond in a manner consistent with responses of corresponding bare metal devices (e.g., memory). When doing so, the system control processor (298) may translate the communications into actions. The actions may be provided to the hardware devices used by the system control processor (298) to present the bare metal resources to the compute resource set(s). In turn, the hardware devices may perform the actions which results in a composed information handling system providing desired computer implemented services.

In some scenarios, multiple system control processors may cooperate to present bare metal resources to a compute resource set. For example, a single information handling system may not include sufficient hardware devices to present a quantity and/or type of resources to a compute resource set as specified by a composition requests (e.g., present two storage devices to a compute resource set when a single information handling system only includes a single storage device). In this scenario, a second system control processor of a second information handling system operatively connected to the system control processor tasked with presenting the resources to a compute resource set may prepare one of its storage devices for presentation. Once prepared, the second system control processor may communicate with the system control processor to enable the system control processor to present the prepared storage device (i.e., the storage device in the information handling system) to the compute resource set. By doing so, resources from multiple information handling system may be aggregated to present a desired quantity of resources to compute resource set(s) to form a composed information handling system.

By forming composed information handling systems as discussed above, embodiments of the invention may provide a system that is able to effectively utilize distributed resources across a range of devices to provide computer implemented services.

The physical resources manager (302) may manage presentation of resources to compute resource sets. For example, the physical resources manager (302) may generate, for example, translation tables that specify actions to be performed in response to bare metal communications obtained from compute resource sets. The translation tables may be used to take action in response to communications from compute resource sets.

The physical resources manager (302) may generate the translation tables based on the components of the compute resource sets, allocations or other types of commands/communications obtained from the compute resource sets, and the resources of the information handling system allocated to service the compute resource set. For example, when a compute resource set is presented with a bare metal resource, it may go through a discovery process to prepare the bare metal resource for use. As the discovery process proceeds, the compute resource set may send commands/communications to the bare metal resource to, for example, discover its address range. The physical resources manager (302) may monitor this process, respond appropriately, and generate the translation table based on these command and the resources available to service these bare metal commands/communications.

For example, consider a scenario where a virtualized disk is allocated to service bare metal storage commands from a compute resource set. In such a scenario, the physical resources manager (302) may generate a translation table that translates physical write from the compute resource set to virtualized writes corresponding to the virtualized disk. Consequently, the virtualized disk may be used by the system control processor (298) to present bare metal resources to the compute resource set.

The emulated resources manager (304) may generate emulation tables that enable resources that would otherwise be incompatible with a compute resource set to be compatible with the compute resource set. Different types of hardware devices of a compute resource set may be compatible with different types of hardware devices. Consequently, resources allocated to provide bare metal resources may not necessarily be compatible with the hardware devices of a compute resource set. The emulated resources manager (304) may generate emulation tables that map bare metal communications obtained from a compute resource set to actions that are compatible with resources allocated to provide bare metal resources to the compute resource sets.

The virtual resources manager (306) may manage virtualized resources that may be allocated to provide bare metal resources to compute resource sets. For example, the virtual resources manager (306) may include hypervisor functionality to virtualized hardware resources and allocate portions of the virtualized resources for use in providing bare metal resources.

While the physical resources manager (302), emulated resources manager (304), and virtual resources manager (306) have been described as generating tables, these components of the system control processor may generate other types of data structures or utilize different management models to provide their respective functionalities without departing from the invention.

To provide the aforementioned state management services, the system control processor (298) may include the state management orchestrator (320). The state management orchestrator (320) may include the functionality to perform the state management services. The state management services may include (i) obtaining requests to perform state management services from a system control processor manager, (ii) generating present state information for the information handling system and/or external resources operatively connected to the system control processor, (iii) using a distributed state storage system to store and obtain present state information, (iv) storing previous state information in the audit storage, and (v) performing audit storage verification. The state management services may include other and/or additional services without departing from the invention. For additional information regarding the state management services, refer to FIG. 5.4. Other components of the system control processor (298) (e.g., composition manager (300)) may perform all, or a portion, of the state management services without departing from the invention.

The functionalities of the physical resources manager (302), emulated resources manager (304), virtual resources manager (306), and the state management orchestrator (320) may be utilized in isolation and/or combination to provide bare metal resources to compute resource sets and to provide management services to the composed information handling system. By doing so, the system control processor (298) may address compatibility issues, sizing issues to match available resources to those that are to be allocated, and/or other issues to enable bare metal resources to be presented to compute resource sets.

When providing bare metal resources, the composition manager (300) may invoke the functionality of the physical resources manager (302), emulated resources manager (304), and virtual resources manager (306). Consequently, resources may be presented as bare metal resources via pass-through (i.e., forwarding IO from compute resource sets to hardware devices), bare metal resource addressing of virtualized resources, and/or as emulated resources compatible with the hardware components of the compute resource set.

The functionality of the physical resources manager (302), emulated resources manager (304), virtual resources manager (306), and the state management orchestrator (320) may be invoked using any communication model including, for example, message passing, state sharing, memory sharing, etc.

The system control processor manager (308) may manage the general operation of the system control processor (298). For example, the system control processor manager (308) may operate as an operating system or other entity that manages the resources of the system control processor (298). The composition manager (300), physical resources manager (302), emulated resources manager (304), virtual resources manager (306), and the state management orchestrator (320) and/or other entities hosted by the system control processor (298) may call or otherwise utilize the system control processor manager (308) to obtain appropriate resources (e.g., processing resources, memory resources, storage, communications, etc.) to provide their functionalities.

The hardware resource services (310) may facilitate use of the hardware components of any number of hardware resource sets (e.g., 110, FIG. 1.2). For example, the hardware resource services (310) may include driver functionality to appropriately communicate with the hardware devices of hardware resource sets. The hardware resource services (310) may be invoked by, for example, the system control processor manager (308).

When providing their functionalities, any of the aforementioned components of the system control processor (298) may perform all, or a portion, methods illustrated in FIG. 5.1-5.3.

The system control processor (298) may be implemented using computing devices. The computing devices may be, for example, an embedded computing device such a system on a chip, a processing device operatively coupled to memory and storage, or another type of computing device. The computing device may include one or more processors, memory (e.g., random access memory), and/or persistent storage (e.g., disk drives, solid state drives, etc.). The persistent storage may store computer instructions, e.g., computer code, that (when executed by the processor(s) of the computing device) cause the computing device to perform the functions of the system control processor (298) described in this application and/or all, or a portion, of the methods illustrated in FIGS. 5.1-5.4. The system control processor (298) may be implemented using other types of computing devices without departing from the invention. For additional details regarding computing devices, refer to FIG. 7.

In one or more embodiments of the invention, the system control processor (298) is implemented as an on-board device. For example, the system control processor (298) may be implemented using a chip including circuitry disposed on a circuit card. The circuit card may also host the compute resource sets and/or hardware resource sets managed by the system control processor (298).

In one or more embodiments of the invention, the composition manager (300), physical resources manager (302), emulated resources manager (304), virtual resources manager (306), state management orchestrator (320), system control processor manager (308), and/or hardware resource services (310) are implemented using a hardware device including circuitry. The hardware device may be, for example, a digital signal processor, a field programmable gate array, or an application specific integrated circuit. The circuitry may be adapted to cause the hardware device to perform the functionality of the composition manager (300), physical resources manager (302), emulated resources manager (304), virtual resources manager (306), state management orchestrator (320), system control processor manager (308), and/or hardware resource services (310). The composition manager (300), physical resources manager (302), emulated resources manager (304), virtual resources manager (306), state management orchestrator (320), system control processor manager (308), and/or hardware resource services (310) may be implemented using other types of hardware devices without departing from the invention.

In one or more embodiments of the invention, the composition manager (300), physical resources manager (302), emulated resources manager (304), virtual resources manager (306), state management orchestrator (320), system control processor manager (308), and/or hardware resource services (310) are implemented using a processor adapted to execute computing code stored on a persistent storage (e.g., as part of the system control processor (298) or operatively connected to the system control processor (298) thereby enabling processors of the system control processor (298) to obtain and execute the computing code) that when executed by the processor performs the functionality of the composition manager (300), physical resources manager (302), emulated resources manager (304), virtual resources manager (306), state management orchestrator (320), system control processor manager (308), and/or hardware resource services (310). The processor may be a hardware processor including circuitry such as, for example, a central processing unit or a microcontroller. The processor may be other types of hardware devices for processing digital information without departing from the invention.

As used herein, an entity that is programmed to perform a function (e.g., step, action, etc.) refers to one or more hardware devices (e.g., processors, digital signal processors, field programmable gate arrays, application specific integrated circuits, etc.) that provide the function. The hardware devices may be programmed to do so by, for example, being able to execute computer instructions (e.g., computer code) that cause the hardware devices to provide the function. In another example, the hardware device may be programmed to do so by having circuitry that has been adapted (e.g., modified) to perform the function. An entity that is programmed to perform a function does not include computer instructions in isolation from any hardware devices. Computer instructions may be used to program a hardware device that, when programmed, provides the function.

In one or more embodiments disclosed herein, the storage (312) is implemented using physical devices that provide data storage services (e.g., storing data and providing copies of previously stored data). The devices that provide data storage services may include hardware devices and/or logical devices. For example, storage (312) may include any quantity and/or combination of memory devices (i.e., volatile storage), long term storage devices (i. e., persistent storage), other types of hardware devices that may provide short term and/or long term data storage services, and/or logical storage devices (e.g., virtual persistent storage/virtual volatile storage).

For example, storage (312) may include a memory device (e.g., a dual in line memory device) in which data is stored and from which copies of previously stored data are provided. In another example, storage (312) may include a persistent storage device (e.g., a solid-state disk drive) in which data is stored and from which copies of previously stored data is provided. In a still further example, storage (312) may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

The storage (312) may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or other hardware device that allocates the storage resources of the physical storage devices.

The storage (312) may store data structures including, for example, composed information handling system data (314), a resource map (316) and a state information (318). Each of these data structures is discussed below.

The composed information handling system data (314) may be implemented using one or more data structures that includes information regarding composed information handling systems. For example, the composed information handling system data (314) may specify identifiers of composed information handling systems and resources that have been allocated to the composed information handling systems.

The composed information handling system data (314) may also include information regarding the operation of the composed information handling systems. The information may include, for example, workload performance data, resource utilization rates over time, and/or other information that may be utilized to manage the operation of the composed information handling systems.

The composed information handling system data (314) may further include information regarding management models employed by system control processors. For example, the composed information handling system data (314) may include information regarding duplicative data stored for data integrity purposes, redundantly performed workloads to meet high availability service requirements, encryption schemes utilized to prevent unauthorized access of data, etc.

The composed information handling system data (314) may be maintained by, for example, the composition manager (300). For example, the composition manager may add, remove, and/or modify information included in the composed information handling system data (314) to cause the information included in the composed information handling system data (314) to reflect the state of the composed information handling systems.

The data structures of the composed information handling system data (314) may be implemented using, for example, lists, tables, unstructured data, databases, etc. While illustrated in FIG. 3 as being stored locally, the composed information handling system data (314) may be stored remotely and may be distributed across any number of devices without departing from the invention.

The resource map (316) may be implemented using one or more data structures that include information regarding resources of the information handling system and/or other information handling systems. For example, the resource map (316) may specify the type and/or quantity of resources (e.g., hardware devices, virtualized devices, etc.) available for allocation and/or that are already allocated to composed information handling systems. The resource map (316) may be used to provide data to management entities such as system control processor managers.

The data structures of the resource map (316) may be implemented using, for example, lists, tables, unstructured data, databases, etc. While illustrated in FIG. 3 as being stored locally, the resource map (316) may be stored remotely and may be distributed across any number of devices without departing from the invention.

The resource map (316) may be maintained by, for example, the composition manager (300). For example, the composition manager (300) may add, remove, and/or modify information included in the resource map (316), to cause the information included in the resource map (316) to reflect the state of the information handling system and/or other information handling systems.

The state information (318) may be implemented using one or more data structures that includes information associated with the current state of the composed information handling system associated with the system control processor (298). The state information (318) may include for example, configuration information that may specify the associated attributes, types, and/or quantities of resources (e.g., hardware devices, virtualized devices, etc.) available for allocation and/or that are already allocated to composed information handling systems and composed information handling system identifiers associated with the composed information handling systems. The state information may include workload information that may specify the type of workload associated with each allocated resource (e.g., managing a database, performing model training, etc.). The state information (318) may include other and/or additional information associated with state of the composed information handling system and the information handling system(s) associated with the system control processor (298) without departing from the invention.

The state information (318) may be maintained by the state management orchestrator (320) of the system control processor (298). The state management orchestrator (320) may generate and update the state information (318) during the performance of state management services using the composed information handling system data (314) and the resource map (316). The state management orchestrator may store the present state information in the distributed state storage system and previous state information in the audit storage, where the present state information and previous state information may be accessed by other system control processors. The system control processor (298) may use the state information (318) to restore management entities (e.g., the system control processor manager (50, FIG. 1.1) and to determine whether a composed information handling system is to be re-composed.

While illustrated in FIG. 3 as being stored locally on the storage (312) of the system control processor (298), the composed information handling system data (314), resource map (316), and the state information (318) may be stored remotely, and may be distributed across any number of devices, including storage devices of the hardware resource set of the composed system without departing from the invention.

While the storage (312) has been illustrated and described as including a limited number and type of data, a storage in accordance with embodiments of the invention may store additional, less, and/or different data without departing from the invention.

While the system control processor (298) has been illustrated and described as including a limited number of specific components, a system control processor in accordance with embodiments of the invention may include additional, fewer, and/or different components without departing from the invention.

Figure 4:
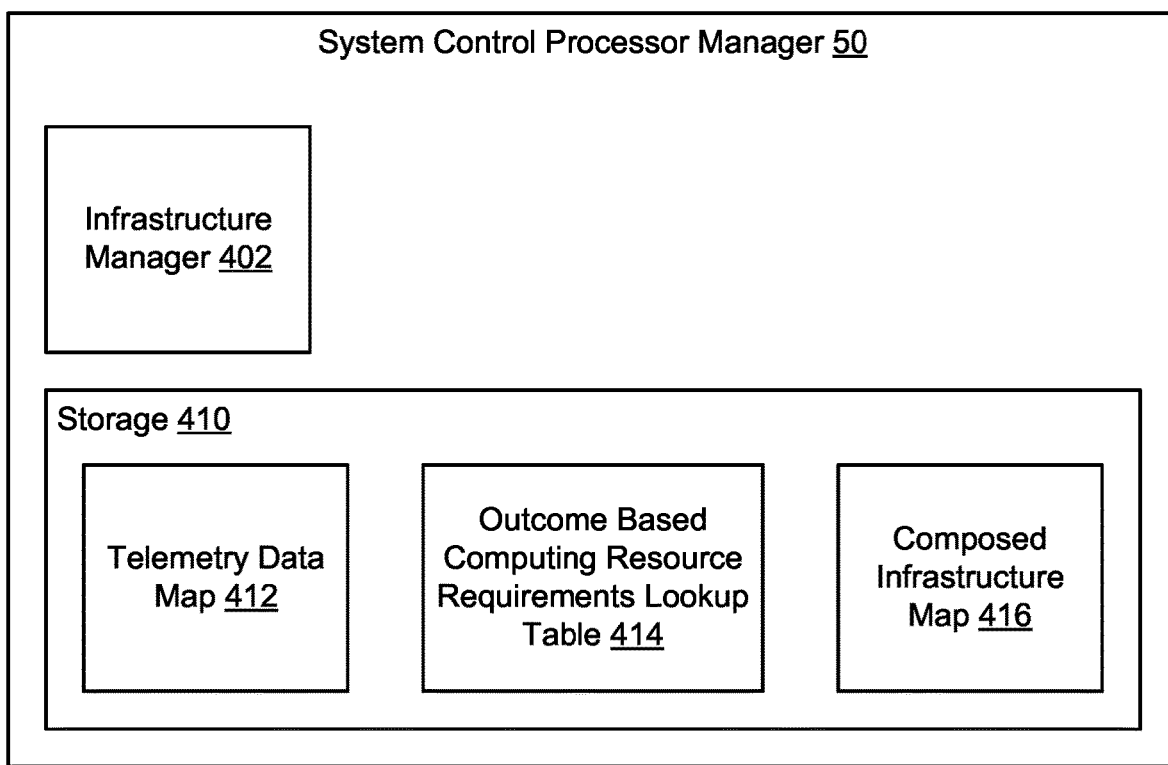
FIG. 4 shows a diagram of a system control processor manager in accordance with one or more embodiments of the invention.

As discussed above, a system control processor manager may cooperate with system control processors of control resource sets to instantiate composed information handling systems by presenting computing resources from hardware resource sets to processors of compute resource sets. FIG. 4 shows a diagram of the system control processor manager (50) in accordance with one or more embodiments of the invention.

The system control processor manager (50) may manage the process of instantiating composed information handling systems. To do so, the system control processor manager (50) may include an infrastructure manager (402) and storage (410). Each of these components is discussed below.

The infrastructure manager (402) may provide composition services.

Composition services may include obtaining composition requests for composed information handling systems, determining the resources to allocate to instantiate composed information handling systems, and cooperating with system control processors to allocate the identified resources. By doing so, the infrastructure manager (402) may cause any number of computer implemented services to be provided using the composed information handling systems.

To determine the resources to allocate to composed information handling systems, the infrastructure manager (402) may employ an intent based model that translates an intent expressed in a composition request to one more allocations of computing resources. For example, the infrastructure manager (402) may utilize an outcome based computing resource requirements lookup table (414) to match an expressed intent to resources to be allocated to satisfy that intent. The outcome based computing resource requirements lookup table (414) may specify the type, quantity, method of management, and/or other information regarding any number of computing resources that when aggregated will be able to satisfy a corresponding intent. The infrastructure manager (402) may identify resources for allocation to satisfy composition requests via other methods without departing from the invention.

To cooperate with the system control processors, the infrastructure manager (402) may obtain telemetry data regarding the computing resources of any number of information handling systems and/or external resources that are available for allocation. The infrastructure manager (402) may aggregate this data in a telemetry data map (412) which may be subsequently used to identify resources of any number of information handling systems and/or external resources to satisfy composition requests (e.g., instantiate one or more composed information handling systems to meet the requirements of the composition requests).

When the infrastructure manager (402) identifies the computing resources to be allocated, the infrastructure manager (402) may communicate with any number of system control processors to implement the identified allocations. For example, the infrastructure manager (402) may notify a system control processor of a control resource set that portions of a hardware resource set are to be allocated to a compute resource set to instantiate a composed information handling system. The system control processor may then take action (e.g., prepare the portion of the hardware resource set for presentation to a processor of the compute resource set) in response to the notification.

As composed information handling systems are instantiated, the infrastructure manager (402) may add information reflecting the resources allocated to composed information handling systems, the workloads being performed by the composed information handling systems, and/or other types of information to a composed infrastructure map (416). The infrastructure manager (402) may utilize this information to, for example, decide whether computing resources should be added to or removed from composed information handling system. Consequently, computing resources may be dynamically re-provisioned over time to meet changing workloads imposed on composed information handling systems.

The system control processor manager (50) may fail and/or otherwise lose the telemetry data map (412) and the composed infrastructure map (416) for any reason without departing from the invention. To continue to provide composition services, the system control processor manager (50) may restore the telemetry data map (412) and the composed infrastructure map (416) by performing a discovery to obtain telemetry data from system control processors, and obtaining state information associated with the composed systems from one or more system control processors. The system control processor manager (50) may use the telemetry data and the state information to repopulate the telemetry data map (412) and the composed infrastructure map (416) and to determine whether any composed information handling systems need to be re-composed.

In one or more embodiments of the invention, the infrastructure manager (402) is implemented using a hardware device including circuitry. The hardware device may be, for example, a digital signal processor, a field programmable gate array, or an application specific integrated circuit. The circuitry may be adapted to cause the hardware device to perform the functionality of the infrastructure manager (402). The infrastructure manager (402 may be implemented using other types of hardware devices without departing from the invention.

In one or more embodiments of the invention, the infrastructure manager (402) is implemented using a processor adapted to execute computing code stored on a persistent storage, that when executed by the processor, performs the functionality of the infrastructure manager (402). The processor may be a hardware processor including circuitry such as, for example, a central processing unit or a microcontroller. The processor may be other types of hardware devices for processing digital information without departing from the invention.

When providing its functionality, the infrastructure manager (402) may perform all, or a portion, of the methods illustrated in FIGS. 5.1-5.4.

In one or more embodiments disclosed herein, the storage (410) is implemented using physical devices that provide data storage services (e.g., storing data and providing copies of previously stored data). The devices that provide data storage services may include hardware devices and/or logical devices. For example, storage (410) may include any quantity and/or combination of memory devices (i. e., volatile storage), long term storage devices (i. e., persistent storage), other types of hardware devices that may provide short term and/or long term data storage services, and/or logical storage devices (e.g., virtual persistent storage/virtual volatile storage).

For example, storage (410) may include a memory device (e.g., a dual in line memory device) in which data is stored and from which copies of previously stored data are provided. In another example, storage (410) may include a persistent storage device (e.g., a solid-state disk drive) in which data is stored and from which copies of previously stored data is provided. In a still further example, storage (410) may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

The storage (410) may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or other hardware device that allocates the storage resources of the physical storage devices.

The storage (410) may store data structures including, for example, the telemetry data map (412), outcome based computing resource requirements lookup table (414) and the composed infrastructure map (416). These data structures may be maintained by, for example, the infrastructure manager (402). For example, the infrastructure manager (402) may add, remove, and/or modify information included in these data structures to cause the information included in these data structure to reflect the state of any number of information handling systems, external resources, and/or composed information handling systems.

Any of these data structures may be implemented using, for example, lists, tables, unstructured data, databases, etc. While illustrated in FIG. 4 as being stored locally, any of these data structures may be stored remotely and may be distributed across any number of devices without departing from the invention.

While the storage (410) has been illustrated and described as including a limited number and type of data, a storage in accordance with embodiments of the invention may store additional, less, and/or different data without departing from the invention.

While the system control processor manager (50) has been illustrated and described as including a limited number of specific components, a system control processor manager in accordance with embodiments of the invention may include additional, fewer, and/or different components than those illustrated in FIG. 4 without departing from the invention.

As discussed above, the system of FIG. 1.1 may provide computer implemented services using composed information handling systems. FIG. 5.1 shows a method that may be performed by components of the system of FIG. 1.1 to manage composed information handling systems.

FIG. 5.1 shows a flowchart of a method in accordance with one or more embodiments of the invention. The method depicted in FIG. 5.1 may be performed to provide computer implemented services using a composed information handling system in accordance with one or more embodiments of the invention. The method shown in FIG. 5.1 may be performed by, for example, a system control processor manager (e.g., 50, FIG. 1.1). Other components of the system in FIG. 1.1 may perform all, or a portion, of the method of FIG. 5.1 without departing from the invention.

While FIG. 5.1 is illustrated as a series of steps, any of the steps may be omitted, performed in a different order, additional steps may be included, and/or any or all of the steps may be performed in a parallel and/or partially overlapping manner without departing from the invention.

In step 500, a composition request for a composed information handling system is obtained. The composition request may be obtained using any method without departing from the invention. For example, the composition request may be obtained as part of a message from another entity operatively connected to a system control processor manager. In another example, the composition request may be locally stored in a storage of a system control processor manager.

The composition request may be a data structure specifying that the composed information handling system is to be instantiated. As discussed with respect to FIG. 3, the composition request may be specific (i.e., includes a listing of resources to be allocated to the composed information handling system) or intent based (i.e., a desired outcome without specifying the resources to be allocated). The composition request may include any type and quantity of information usable to determine how to instantiate a composed information handling system.

In one or more embodiments of the invention, the composition request includes a list of computing resources to be allocated to the composed information handling system. For example, the composition request may specify computing resources, memory resources, storage resources, graphics processing resources, compute acceleration resources, communications resources, etc. The list may include any type and quantity of computing resources. The list of computing resources may include computing resources to be used to provide data protection services. The list of computing resources may specify one or more resources to be used as a distributed state storage system and an audit storage, and one or more computing resources to perform state management services using the distributed state storage system and the audit storage.

In one or more embodiments of the invention, the composition request specifies how the computing resources are to be presented. For example, the composition request may specify virtualization, emulation, etc. for presenting the computing resources.

In one or more embodiments of the invention, the composition request specifies how the resources used to present the computing resources are to be managed (e.g., a management model such as data integrity, security, management, usability, performance, etc.). For example, the composition request may specify levels of redundancy for data storage, data integrity to be employed (e.g., redundant array of independent disks (RAID), error correction code (ECC), etc.), levels of security to be employed for resources (e.g., encryption), and/or other information that specifies how system control processors are to utilize resources for presentation of resources to composed information handling systems. The composition request may specify that data protection services are to be provided to the computing resources of the composed information handling system. The data protection services may include performing deduplication and/or compression on data generated by applications executing in the composed information handling system. The methods employed by the system control processors, or a portion thereof, may be transparent to the composed information handling systems because the resources may be presented to the compute resource sets of the composed information handling systems as bare metal resources while the system control processors provide the management functionality.

In one or more embodiments of the invention, the composition request includes a list of applications to be hosted by the composed information handling system. The list may include any type and quantity of applications.

The composition request may also specify the identities of one or more system control processors hosted by other devices. In some scenarios, as noted above, resources from other information handling systems may be used to form a composed information handling system. The identifiers of the system control processors of these other information handling systems may be used to form operable connections between the system control processors. These connections may be used by the system control processors to present, as bare metal resources, computing resources from other information handling systems to compute resource set(s) of the composed information handling system.

In one or more embodiments of the invention, the composition request specifies a desired outcome. The desired outcome may be, for example, computer implemented services to be provided in response to the composition request. In another example, the desired outcome may be a list of applications to be hosted in response to the composition request. In other words, the composition request may specify a desired outcome without specifying the resources that are to be used to satisfy the requests, the methods of managing the resources, models employed to provide for data protection/integrity/security/etc. Such a composition request may be referred to as an intent based composition request.

In step 502, at least one compute resource set having computing resources specified by the composition request is identified. The at least one compute resource set may be identified by matching the computing resources specified by the composition request to at least one compute resource set having those resources using a telemetry data map (412, FIG. 4).

For example, the telemetry data map (412, FIG. 4) may specify a list of compute resource sets, identifiers of control resource sets that manage the listed compute resource sets, the hardware devices of the listed compute resource sets, and characteristics and information regarding the compute resource set (e.g., memory size, storage size). By matching the computing resources specified by the composition request to the hardware devices specified in the list, the compute resource set corresponding to the listed hardware devices may be identified as the at least one compute resource set.

If no compute resource set includes all of the computing resources specified by the composition request, multiple compute resource sets having sufficient hardware devices to meet the computing resources specified by the composition request may be identified as the at least one compute resource set.

In step 504, at least one hardware resource set having hardware resources specified by the composition request is identified. The at least one hardware resource set may be identified similarly to that described with respect to the identified of the at least one compute resource set of step 502. For example, the computing resources requirements specified by the composition request may be matched to compute resource sets.

In step 506, state management services for managing state information of the composed system are setup using at least one control resource set to obtain logical hardware resources managed by the at least one control resource set. Additional management services may also be set up. The additional management services may include, for example, virtualization, emulation, abstraction, indirection, duplicative writes, deduplication, compression, backup generation, and/or other type of services to meet the requirements of data integrity, security, and/or management models.

The control resource set may provide at least a portion of the management services to the at least one hardware resource set identified in step 506.

The state management services may be setup for the hardware resource set using the at least one control resource set to obtain logical hardware resources via the method of FIGS. 5.2-5.3 without departing from the invention. For additional information regarding setting up state management services for the hardware resource set, using the at least one control resource set to obtain logical hardware resources, refer to FIGS. 5.2-5.3.

In step 508, the logical hardware resources are presented to the at least one compute resource set as bare metal resources using the at least one control resource set to instantiate the composed information handling system to service the composition request.

To present the logical hardware resources, the system control processor manager may instruct the system control processors of the at least one control resource set to make the bare metal resources discoverable. For example, the at least one control resource set may send a bare metal communication to one or more processors of the at least one compute resource set to cause the processors to discover the presence of the presented bare metal resources. By doing so, the processors may then begin to utilize the logical hardware resources as bare metal resources resulting in a composed information handling system having all of the resources necessary to provide desired computer implemented services.

The method may end following step 508.

Using the method illustrated in FIG. 5.1, a composed information handling system may be formed using computing resources from one or more information handling systems and/or external resources.

Following step 508 of FIG. 5.1, no applications may be presently executing on the composed information handling system. The composed information handling systems may then be turned over to other entities for management (e.g., orchestrators) or may be additionally managed by the system control processor manager by instructing the system control processors to load applications onto the composed information handling systems using any method without departing from the invention. For example, device images (e.g., data structures including information that may be used to instantiate one or more applications in corresponding operating states) may be used to begin execution of appropriate applications in desired states. By doing so, the composed information handling systems may begin to provide desired computer implemented services. Applications may be instantiated on a composed information handling system using other methods (e.g., performing first-time installations, copying binaries to storage and beginning execution of the binaries, etc.) without departing from the invention.

Concurrently with or following the steps illustrated in FIG. 5.1, the composed information handling system data (314, FIG. 3) and resource map (316, FIG. 3) may be updated to reflect that various resources have now been allocated and are no longer available for allocation. For example, the resource map (316, FIG. 3) may be updated to indicate that the various hardware/virtualized devices being utilized to present bare metal resources to the composed information handling system are now allocated and unavailable (at least in part if virtualized) for allocation to present bare metal resources to other composed information handling systems. The resource maps maintained by the system control processor manager may be similarly updated.

Turning to FIGS. 5.2-5.3, FIGS. 5.2-5.3 show a flowcharts of a method of setting up state management services in accordance with one or more embodiments of the invention. The method of FIGS. 5.2-5.3 may be performed to setup state management services for managing state information using at least one control resource set to obtain logical hardware resources. The method shown in FIGS. 5.2-5.3 may be performed by, for example, a system control processor manager (e.g., 50, FIG. 1.1). Other components of the system in FIG. 1.1 may perform all, or a portion, of the methods of FIGS. 5.2-5.3 without departing from the invention.

While FIGS. 5.2-5.3 is illustrated as a series of steps, any of the steps may be omitted, performed in a different order, additional steps may be included, and/or any or all of the steps may be performed in a parallel and/or partially overlapping manner without departing from the invention.

Turning to FIG. 5.2, in step 520, a determination is made as to whether a distributed state storage system is included in the system. This composed system may be a re-composition of a previously instantiated composed information handling system that included a distributed state storage system, or a distributed state storage system may be included in a previously generated composed information handling system that may be available to use by the composed information handling system for state management purposes. In one or more embodiments of the invention, the system control processor manager uses a composed infrastructure map (e.g., 416, FIG. 4) to identify whether a distributed state storage system is available to be allocated to the composed information handling system. As discussed above, the composed infrastructure map may include information regarding composed information handling systems that may specify whether a compute resource set of a composed information handling system currently includes a distributed state storage system. If the composed infrastructure map indicates a distributed state storage system is available, then the system control processor manager may determine that a distributed state storage system is included in the system. If the composed infrastructure map does not indicate that a distributed state storage system is available, then the system control processor manager may determine that no distributed state storage system is included in the system. The determination as to whether a distributed state storage system is included in the system may be made via other and/or additional methods without departing from the invention.

If it is determined that a distributed state storage system is included in the system, then the method proceeds to step 522. If it is determined that a distributed state storage system is not included in the system, then the method proceeds to step 528.

In step 522, a determination is made as to whether the system includes a new control resources set. As discussed above, the composed system may be a re-composition of a previously instantiated composed information handling system or a newly instantiated composed system. The composed infrastructure map may specify whether the composition request is associated with a re-composition or a newly instantiated composed information handling system. The composed infrastructure map may also specify whether the at least one control resource set includes a new control resources set (i.e., system control processors added to a re-composed system or the system control processors allocated to a newly instantiated composed system). Accordingly, if the composed infrastructure map specifies that the composed system includes a new control resources set, then the system control processor manager may determine that the system includes a new control resources set. If the composed infrastructure map specifies that the composed system does not include a new control resources set, then the system control processor manager may determine that the system does not include a new control resources set. The determination as to whether the system includes a new control resources set may be made via other and/or additional methods without departing from the invention.

If it is determined that the system includes a new control resources set, then the method proceeds to step 524. If it is determined that the system does not include a new control resources set, then the method may proceed to step 534.

In step 524, the new control resource set is registered with the distributed state storage system. In one or more embodiments of the invention, the system control processor instantiates a file sharing application associated with the distributed state storage system on the system control processors of the new control resource set. Additionally, the system control processor manager may allocate a storage device of or operatively connected to the system control processors of the new control resource set to store state information. In one or more embodiments of the invention, the system control processor manager sends a registration request to the system control processors currently registered and with the distributed storage state system. The registration request may include system control processor identifiers of the system control processor included in the new control resource set. The registration request may also include contact information (e.g., network address, port number, etc.) associated with the system control processors and the file sharing applications hosted thereon. Upon receiving the registration request, the currently registered system control processors may discover the system control processors of the new control resource set. Consequently, after registration, the distributed state storage system may include the new control resource set. The system control processors of the new control resource set may now share and/or obtain state information between other system control processors of the system through the distributed state storage system. The new control resource set may be registered with the distributed state storage system via other and/or additional methods without departing from the invention.

In step 526, the at least one control resource set is prepared to perform state management services using the distributed state storage system. To prepare the at least one control resource set to perform the state management services, the system control processor manager may cooperate with the at least one control resource set. For example, the system control processor manager may generate instructions for implementing the state management services using the distributed state storage system, encapsulate the instructions in a message, and send the message to one or more system control processors of the new control resource set. In response to receiving the message, the system control processors may implement the instructions thereby implementing state management services using the distributed state storage system and any other and/or additional management services such as data protection services, virtualization, emulation, etc.

The system control processor manager may also include identification information for the system control processors that will cooperate in presenting resources as part of instantiating a composed information handling system and performing state management services. Consequently, the system control processors of the new control resource sets that perform state management services using the distributed state storage system may be able to identify each other, communicate with one another, etc.

Setting up state management services and other management services for the hardware resource set may include, for example, preparing translation, indirection, or abstraction tables used to translate logical addresses provided by compute resource sets to physical addresses utilized by hardware devices of the hardware resource.

In another example, setting up state management services and other management services may include, if the type of the resource allocation is a portion of a virtualized resource, making a call to a virtualization resources manager to allocate the portion of resources from an existing virtualized resource or by instantiating a new virtualized resource and allocating the portion from the new virtualized resource.

In a still further example, if the type of the resource allocation requires an emulated resource, providing data protection services and management services may include instantiating a corresponding emulation layer between a hardware device of the hardware resource set and the compute resource set. Consequently, bare metal communications between the compute resource set and the hardware device used to present the bare metal resource to the compute resource set may be automatically translated by the system control processor.

Setting up state management services and other management services may further include modifying the operation of one or more devices to provide state management functionality. Other functionalities may include, for example, data integrity functionality (e.g., RAID, ECC, etc.), security functionality (e.g., encryption), and/or other functionalities that are transparent to the composed information handling system.

The at least one control resource set may be prepared to perform data protection services using the distributed state storage system via other and/or additional methods without departing from the invention.

The method may proceed to step 534 (see FIG. 5.3) following step 526.

In step 528, additional computing resources to be allocated to instantiate the distributed state storage system are identified. The additional computing resources may be identified by matching the computing resources for a distributed state storage system specified by the composition request to at least one control resource sets, and/or hardware resource sets having those resources using a telemetry data map (412, FIG. 4), and/or an outcome based computing resource requirements lookup table (414, FIG. 4).

For example, the telemetry data map (412, FIG. 4) may specify a list of control resource sets and/or hardware resource sets, identifiers of the control resource sets, the hardware devices of the listed compute resource sets, and characteristics and information regarding the available computing resources (e.g., memory size, storage size). By matching the computing resources specified by the composition request for a distributed state storage system to the hardware devices specified in the list, the compute resource set corresponding to the listed hardware devices may be identified as the additional computing resources.

If no control resource set and/or hardware resource set includes all of the computing resources specified by the composition request, multiple control resource sets and/or hardware resource sets having sufficient hardware devices to meet the computing resources specified by the composition request may be identified as the at least one compute resource set.

In still a further example, the composition request may specify that a distributed state storage system may be allocated to the composed information handling system if there is not one already included in the system. The outcome-based computing resource requirements may specify computing requirements associated with a distributed state storage system. By matching the distributed state storage system outcome to the hardware devices that provide the necessary requirements specified by the outcome based computing resource requirements lookup table, the control resource set and/or the hardware resource set corresponding to the hardware devices requirements may be identified as the additional computing resources.

The additional computing resources to instantiate the distributed state storage system may be identified via other and/or additional methods without departing from the invention.

In step 530, the distributed state storage system is instantiated using the additional computing resources. The system control processor manager may generate instructions and a device image associated with a file sharing application for instantiating the distributed state storage system, encapsulate the instructions and device image in messages, and send the messages to one or more system control processors of the at least one control resource set. In response to receiving the message, the system control processors may implement the instructions thereby instantiating the file sharing application using the device image. The message may also include storage allocations of system control processors and/or storage devices operatively connected to the system control processors for local storing of state information that may be shared between system control processors using the distributed state storage system. The system control processors may allocate storage for local storing of state information in response to obtaining the message. The distributed state storage system may be instantiated using the additional computing resources via other and/or additional methods without departing from the invention.

In step 532, the at least one control resource set is registered with the distributed state storage system. The system control processor manager sends a registration request to the system control processors. The registration request may include system control processor identifiers of all the system control processors included in the at least one control resource set. The registration request may also include contact information (e.g., network address, port number, etc.) associated with the system control processors and the file sharing applications hosted thereon. Upon receiving the registration request, the system control processors may discover the other system control processors of the at least control resource set. Consequently, after registration, the distributed state storage system may include the at least one control resource set. The system control processors of the at least one control resource set may now share and/or obtain state information between other system control processors of the system through the distributed state storage system. The at least one control resource set may be registered with the distributed state storage system via other and/or additional methods without departing from the invention.

The method may proceed to step 526 following step 532.

Turning to step 534, in FIG. 5.3, a determination is made as to whether an audit storage is included in the system. This composed system may be a re-composition of a previously instantiated composed information handling system that included an audit storage, or an audit storage may be included in a previously generated composed information handling system that may be available to use by the composed information handling system for state management purposes. In one or more embodiments of the invention, the system control processor manager uses a composed infrastructure map (e.g., 416, FIG. 4) to identify whether an audit storage is available to be allocated to the composed information handling system. As discussed above, the composed infrastructure map may include information regarding composed information handling systems that may specify whether a compute resource set of a composed information handling system currently includes an audit storage. If the composed infrastructure map indicates an audit storage is available, then the system control processor manager may determine that an audit storage is included in the system. If the composed infrastructure map does not indicate that an audit storage is available, then the system control processor manager may determine that no audit storage is included in the system. The determination as to whether an audit storage is included in the system may be made via other and/or additional methods without departing from the invention.

If it is determined that an audit storage is included in the system, then the method proceeds to step 536. If it is determined that an audit storage is not included in the system, then the method proceeds to step 542.

In step 536, a determination is made as to whether the system includes a new control resources set. As discussed above, the composed system may be a re-composition of a previously instantiated composed information handling system or a newly instantiated composed system. The composed infrastructure map may specify whether the composition request is associated with a re-composition or a newly instantiated composed information handling system. The composed infrastructure map may also specify whether the at least one control resource set includes a new control resources set (i.e., system control processors added to a re-composed system or the system control processors allocated to a newly instantiated composed system). Accordingly, if the composed infrastructure map specifies that the composed system includes a new control resources set, then the system control processor manager may determine that the system includes a new control resources set. If the composed infrastructure map specifies that the composed system does not include a new control resources set, then the system control processor manager may determine that the system does not include a new control resources set. The determination as to whether the system includes a new control resources set may be made via other and/or additional methods without departing from the invention.

If it is determined that the system includes a new control resources set, then the method proceeds to step 538. If it is determined that the system does not include a new control resources set, then the method may end following step 536.

In step 538, the new control resource set is registered with the audit storage.

In one or more embodiments of the invention, the system control processor instantiates a file sharing application associated with the audit storage on the system control processors of the new control resource set. Additionally, the system control processor manager may allocate a storage device of, or operatively connected to, the system control processors of the new control resource set to store state information. In one or more embodiments of the invention, the system control processor manager sends a registration request to the system control processors currently registered and with the distributed storage state system. The registration request may include system control processor identifiers of the system control processor included in the new control resource set. The registration request may also include contact information (e.g., network address, port number, etc.) associated with the system control processors and the file sharing applications hosted thereon. Upon receiving the registration request, the currently registered system control processors may discover the system control processors of the new control resource set. Consequently, after registration, the audit storage may include the new control resource set. The system control processors of the new control resource set may now share and/or obtain state information between other system control processors of the system through the audit storage. The new control resource set may be registered with the audit storage via other and/or additional methods without departing from the invention.

In step 540, the at least one control resource set is prepared to perform state management services using the audit storage. To prepare the at least one control resource set to perform the state management services, the system control processor manager may cooperate with the at least one control resource set. For example, the system control processor manager may generate instructions for implementing the state management services using the audit storage, encapsulate the instructions in a message, and send the message to one or more system control processors of the new control resource set. In response to receiving the message, the system control processors may implement the instructions thereby implementing state management services using the audit storage and any other and/or additional management services such as data protection services, virtualization, emulation, etc.

The method may end following step 540.

In step 542, additional computing resources to be allocated to instantiate the audit storage are identified. The additional computing resources may be identified by matching the computing resources for an audit storage specified by the composition request to at least one control resource sets, and/or hardware resource sets having those resources using a telemetry data map (412, FIG. 4), and/or an outcome based computing resource requirements lookup table (414, FIG. 4).

For example, the telemetry data map (412, FIG. 4) may specify a list of control resource sets and/or hardware resource sets, identifiers of the control resource sets, the hardware devices of the listed compute resource sets, and characteristics and information regarding the available computing resources (e.g., memory size, storage size). By matching the computing resources specified by the composition request for an audit storage to the hardware devices specified in the list, the compute resource set corresponding to the listed hardware devices may be identified as the additional computing resources.

If no control resource set and/or hardware resource set includes all of the computing resources specified by the composition request, multiple control resource sets and/or hardware resource sets having sufficient hardware devices to meet the computing resources specified by the composition request may be identified as the at least one compute resource set.

In still a further example, the composition request may specify that an audit storage may be allocated to the composed information handling system if there is not one already included in the system. The outcome based computing resource requirements may specify computing requirements associated with an audit storage. By matching the audit storage outcome to the hardware devices that provide the necessary requirements specified by the outcome based computing resource requirements lookup table, the control resource set and/or the hardware resource set corresponding to the hardware devices requirements may be identified as the additional computing resources.

The additional computing resources to instantiate the audit storage may be identified via other and/or additional methods without departing from the invention.

In step 544, the audit storage is instantiated using the additional computing resources. The system control processor manager may generate instructions and a device image associated with a file sharing application for instantiating the audit storage, encapsulate the instructions and device image in messages, and send the messages to one or more system control processors of the at least one control resource set. In response to receiving the message, the system control processors may implement the instructions thereby instantiating the file sharing application using the device image. The message may also include storage allocations of system control processors and/or storage devices operatively connected to the system control processors for local storing of state information that may be shared between system control processors using the audit storage. The system control processors may allocate storage for local storing of state information in response to obtaining the message. The audit storage may be instantiated using the additional computing resources via other and/or additional methods without departing from the invention.

In step 546, the at least one control resource set is registered with the audit storage. The system control processor manager sends a registration request to the system control processors. The registration request may include system control processor identifiers of all the system control processors included in the at least one control resource set. The registration request may also include contact information (e.g., network address, port number, etc.) associated with the system control processors and the file sharing applications hosted thereon. Upon receiving the registration request, the system control processors may discover the other system control processors of the at least control resource set. Consequently, after registration, the audit storage may include the at least one control resource set. The system control processors of the at least one control resource set may now share and/or obtain state information between other system control processors of the system through the audit storage. The at least one control resource set may be registered with the audit storage via other and/or additional methods without departing from the invention.

The method may proceed to step 540 following step 546.

Using the method illustrated in FIGS. 5.2-5.3, management services including state management services may be setup by preparing the at least one control resource set and the at least one hardware resource set to be presented to the compute resource set as logical hardware resources, and preparing the at least one control resource set to provide state management services that are transparent to compute resource set using the distributed state storage system and the audit storage.

Turning to FIG. 5.4, this figure shows a flowchart of a method in accordance with one or more embodiments of the invention. The method depicted in FIG. 5.4 may be performed to perform state management services in accordance with one or more embodiments of the invention. The method shown in FIG. 5.4 may be performed by, for example, a system control processor (e.g., 114, FIG. 1.2) of an information handling system (e.g., 62, FIG. 1.1). Other components of the system in FIG. 1.1 may perform all, or a portion, of the method of FIG. 5.4 without departing from the invention.

While FIG. 5.4 is illustrated as a series of steps, any of the steps may be omitted, performed in a different order, additional steps may be included, and/or any or all of the steps may be performed in a parallel and/or partially overlapping manner without departing from the invention.

Prior to step 550, a composed information handling system, including a system control processor, a distributed state storage system and an audit storage, was instantiated based on a composition request via the methods of FIGS. 5.1-5.3 discussed above. The composition request may indicate that state management services are to be implemented for the composed information handling system as discussed below in FIG. 5.4. The state management services may include other and/or additional services, and may be implemented via other and/or additional methods without departing from the invention.

In step 550, a request to perform state management services is obtained from a system control processor manager. As discussed above, the system control processor manager may send a message to the system control processor to allocate resources to instantiate a composed information handling system and to prepare the system control processor to perform state management services for the composed information handling system. In response to obtaining the message, the system control processor allocates the resources and instantiates the composed information handling system. In doing so, the system control processor may update composed information handling system data and a resource map. The message may further include a request and/or instructions to perform state management services. The message may include other and/or additional information without departing from the invention. After instantiating the composed information, the system control processor may begin to perform state management services as specified by the message obtained from the system control processor manager. The request to perform state management services may be obtained from the system control processor manager via other and/or additional methods without departing from the invention.

In step 552, current state information associated with the composed information handling system is generated. In one or more embodiments of the invention, the system control processor manager generates current state information based on the current composed information handling system using the composed information handling system data and the resource map.

The current state information may specify the at least one compute resource set, the at least one control resource set, and the at least one hardware resource set allocated by the system control processor to instantiate the composed information handling system. The current state information may further include the workloads, portions of the workloads, and/or services (e.g., executing applications, performing data protection services, storing data, performing model training, etc.) performed by the at least one compute resource set, the at least one control resource set, and the at least one hardware resource set allocated by system control processor. The current state information may also specify any abstractions (e.g., virtualizations, emulations, etc.) performed by the at least one control resource set for the at least one hardware resource set allocated by the system control processor. The current state information may also specify unallocated computing resources of the information handling system(s) and/or external resources that are operatively connected to and managed by the system control processor.

The current state information may include and/or specify other and/or additional information regarding the current state of the composed information handling system, and/or unallocated computing resources managed by the system control processor without departing from the invention. The current state information associated with the composed information handling system may be generated via other and/or additional methods without departing from the invention.

In step 554, the current state information is stored in the distributed state storage system. In one or more embodiments of the invention, the system control processor stores the current state information locally in a storage device(s) of the system control processor (e.g., memory), and/or a storage device operatively connected to the system control processor allocated to store current state information. Moreover, the file sharing application of the distributed state storage system may share the state information with other system control processors in the system. The file sharing application of the distributed state storage system may also obtain current state information from other system control processors through the distributed state storage system. As a result, the current state information of the system control processor may be stored in the distributed state storage system, and may therefore be accessible by any system control processor in the system for restoration purposes and/or to maintain the current state of the composed information handling system. The state information may be stored in the distributed state storage system via other and/or additional methods without departing from the invention.

In step 556, a determination is made as to whether the distributed state storage system is able to maintain the previous state information. As discussed above, the storage resources allocated to store state information that may be included in the distributed state storage system may reach a capacity limit such that the storage resources may not include sufficient storage capacity to store current state information generated in the future without offloading previous state information to the audit storage. Additionally, previous state information may be associated with a retention period. The previous state information may be offloaded to the audit storage when the retention period expires. If the system control processor identifies that a storage capacity limit is exceeded for the storage resources of the distributed state storage system or the retention period of the previous state information has expired, then the system control processor may determine that the distributed state storage system is not able to maintain the previous state information. If the system control processor identifies that a storage capacity limit is not exceeded for the storage resources of the distributed state storage system and the retention period of the previous state information has not expired, then the system control processor may determine that the distributed state storage system is able to maintain the previous state information. The determination as to whether the distributed state storage system is able to maintain the previous state information may be made via other and/or additional methods without departing from the invention.

In one or more embodiments of the invention, if it is determined that the distributed state storage system is able to maintain the previous state information, then the method proceeds to step 562. In one or more embodiments of the invention, if it is determined that the distributed state storage system is not able to maintain the previous state information, then the method proceeds to step 558.

In step 558, the previous state information is stored in the audit storage. In one or more embodiments of the invention, the system control processor stores the previous state information locally in a storage device(s) of the system control processor (e.g., memory) and/or a storage device operatively connected to the system control processor allocated to store previous state information. Furthermore, the system control processor may sign the previous state information using a root of trust of the system control processor and any appropriate cryptographic security technology without departing from the invention. As such, other system control processor may validate the signed previous state information during audit storage verifications. Moreover, the file sharing application of the audit storage may share the signed previous state information with other system control processors in the system. The file sharing application of the audit storage may also obtain signed previous state information from other system control processors through the audit storage. As a result, the signed previous state information of the system control processor may be stored in the audit storage, and may therefore be accessible by any system control processor in the system for point-in-time restoration purposes to restore the composed information handling system to a previous state or to provide a user with a historical representation of the composed information handling system. The previous state information may be stored in the audit storage via other and/or additional methods without departing from the invention.

In step 560, audit storage verification is performed. As discussed above, the system control processor may obtain previous state information of other system control processors included in the system via the file sharing applications of the audit storage. The system control processor may obtain all and/or a portion of the other system control processors' previous state information without departing from the invention. The system control processor may determine if there are any validation issues associated with each previous state information of the other system control processors. For example, the system control processor may check to see if the previous state information is signed and validate the signature using the root of trust and any appropriate cryptographic security technology without departing from the invention. If the previous state information is not signed or is not signed using the root of trust, then the system control processor may identify a validation issue. As another example, the system control processor may compare the contents of the previous state information with the contents of validated previous state information associated with the previous state information to validate the changes from the validated previous state information to the previous state information. If the changes from the validated previous state information to the previous state information cannot be confirmed, the system control processor may identify a validation issue.

If the system control processor identifies a validation issue associated with previous state information of other system control processors, the system control processor may notify the system control processor manager and/or a user of the system and both of which may perform any number of remediation actions (e.g., shut down the system control processor associated with the validation issue, replace the system control processor associated with the validation issue, etc.) without departing from the invention. If the system control processor does not identify a validation issue associated with a previous state information, the system control processor may validate the previous state information. To validate the previous state information, the system control processor may, for example, tag the previous state information with a validation tag and the system control processor identifier associated with the system control processor identifier to notify other system control processors that the previous state information has been validated by the system control processor. Audit storage verification may be performed via other and/or additional methods without departing from the invention.

The method may end following step 560.

In step 562, the previous state information is stored with the current state information in the distributed state storage system. The system control processor may leave the previous storage information stored in the storage resources associated with the distributed state storage system and not offload the previous state information to the audit storage. The previous state information may be stored with the current state information in the distributed state storage system via other and/or additional methods without departing from the invention.

The method may proceed to step 560 following step 562.

Using the method illustrated in FIG. 5.4, state management services may be performed by one or more system control processors for composed information handling systems. As a result, sufficient current state information may be readily available in the distributed state storage system to restore system control processors, to restore the system control processor manager, and/or to re-compose the composed information handling system to the current state due to computing resource failures. Additionally, previous state information may be stored and validated in the audit storage. As a result, the composed information handling systems may be restored to a particular point-in-time and/or user may obtain a historical representation of the composed information handling systems.

To further clarify embodiments of the invention, a non-limiting example is provided in FIGS. 6.1-6.4. FIGS. 6.1 and 6.4 shows a system similar to that illustrated in FIG. 1.1. Actions performed by components of the illustrated system are illustrated by numbered, circular boxes interconnected, in part, using dashed lines. For the sake of brevity, only a limited number of components of the system of FIG. 1.1 are illustrated in FIGS. 6.1 and 6.4. FIGS. 6.2-6.3 show diagrams of examples of data structures utilized by the example system of FIGS. 6.1 and 6.4.

Example

Consider a scenario as illustrated in FIG. 6.1 in which a client (602), at step 1, sends a composition request to a system control processor manager (600) that manages two information handling systems (IHS), IHS A (610) and IHS B (630). The composition request specifies that a composed information handling system is to be instantiated to perform a database application workload.

In response to the composition request, the system control processor manager (600), at step 2, identifies computing resources to be allocated to the composed information handling system using the table illustrated in FIG. 6.3. As seen in FIG. 6.3, the outcome based computing resource requirements lookup table (660) includes an entry (e.g., 662) associated with hosting of a database application.

The database application entry (662) is used by the system control processor manager (600) to ascertain the computing resource requirements for the composed information handling system. For example, the database application entry (662) specifies that a compute resource set (664), control resource set (666) and hardware resource set (668) need to be allocated to the composed information handling system to have the composed information handling system be capable of performing the workload associated with a database application. The compute resource set (664) specified by the entry includes one processor and one gigabyte of memory, the control resource set (666) includes state management for the composed information handling system, and the hardware resource set (668) includes two terabytes of solid state disk space. Using the information included in the database application entry (662), the system control processor manager (600) identifies corresponding compute, control, and hardware resource sets for allocation to the composed information handling system using a telemetry data map (640) as illustrated in FIG. 6.2.

As seen in FIG. 6.2, the telemetry data map (640) includes entries (642, 652) that specify the resource sets and corresponding hardware devices of these resource sets of information handling system (IHS) A (e.g., 610, FIG. 6.1) and IHS B (e.g., 630, FIG. 6.1). For example, the telemetry data map (640) includes an entry (642) associated with IHS A (610, FIG. 6.1) which specifies that IHS A (610, FIG. 6.1) includes a compute resource set (644) that includes a processor and memory, a control resource set (648) that includes a system control processor, and a hardware resource set (650) that includes a solid state disk that has two terabytes of storage space. Additionally, the telemetry data map (640) includes an entry (652) associated with IHS B (630, FIG. 6.1) which specifies that IHS B (630, FIG. 6.1) includes a compute resource set (654) that includes a processor and memory, a control resource set (656) that includes a system control processor, and a hardware resource set (658) that includes a solid state disk that has two terabytes of storage space.

Returning to FIG. 6.1, based on the information included in the tables illustrated in FIGS. 6.2 and 6.3, the system control processor manager (600), at step 3, determines that a composed information handling system should be instantiated utilizing compute resource set A (612), system control processor A (614), and solid state disk A (616) of IHS A (610), and system control processor B (634) and solid state disk B (636) of IHS B (630). Furthermore, the system control processor manager (600) determines that system control processor A (614) and system control processor B (634) are to perform state management services.

Based on the determinations, a message, at step 4, indicating these resources of the information handling system (610) is sent to system control processor A (614). The message indicates that the compute resource set A (612), one terabyte of the solid state disk A (616) storage space, and one terabyte of solid state disk B (636) is to be allocated to the composed information handling system. The message also indicates that system control processor A (614) and system control processor B (634) are to provide state management services.

In response to the message, at step 5, system control processor A (614) determines that one terabyte of solid state disk A (616) should be presented by virtualizing a terabyte of solid state disk A (616) as storage resource A (620). System control processor A (614) generates an appropriate address translation table associated with storage resource A (620) to present the one terabyte of storage as storage resource A (620). At step 6, system control processor A (614) uses the appropriate address table to obtain storage resource A (620) from solid state disk A (616).

At step 7, system control processor A (614) determines that an additional one terabyte of storage is be included in the composed information handling system and that system control processor B (634) is to be used for state management services. Therefore, system control processor A (614), at step 8, sends a message to system control processor B (634) to provide the additional one terabyte of storage to the composed information handling system and to instantiate the distributed state storage system (626) using system control processor B (634). In response to the message, at step 9, system control processor B (634) determines that one terabyte of solid state disk B (636) should be presented by virtualizing a terabyte of solid state disk B (636) as storage resource B (624). System control processor B (634) generates a second appropriate address translation table associated with storage resource B (624). At step 10, system control processor B (634) uses the second appropriate address table to obtain storage resource B (624) and from solid state disk B (636). At step 11, system control processor B (634) determines that the distributed state storage system (626) is to be instantiated.

In response to the determination, at step 12, system control processor B instantiates the distributed state storage system (626) and registers system control processor A (614) with the distributed state storage system (626). At step 13, system control processor B (634) sends a message to system control processor A (614). The message indicates that the distributed state storage system (626) is instantiated and further includes the second address table associated with storage resource B (624). At step 14, system control processor A (614) determines that it is to provide state management services for the composed information handling system, and therefore should instantiate an audit storage (622) using the remaining portion of solid state disk A (616). Then, at step 15, system control processor A (614) instantiates the audit storage (622), registers with the audit storage, and registers system control processor B (634) with the audit storage (622). At step 16, system control processor A (614) presents storage resource A (620) and storage resource B (624) as bare metal resources to compute resource set A (612) to obtain the composed information handling system. At step 17, compute resource set A (612) begins execution of the database application.

Turning to FIG. 6.4, after the composed information handling system is obtained, system control processor A (614) and system control processor B (634) perform state management services. At step 18, system control processor A (614) generates current state information associated with IHS A (610). The generated current state information associated with IHS A (610) specifies compute resource A (612) is executing a data base application and solid state disk A (616) was virtualized to obtain storage resource A (620). At step 19, system control processor A (614) uses a file sharing application to store the current state information associated with IHS A (610) in the distributed state storage system (624). At step 20, system control processor A (614) determines that the distributed state storage system (624) is unable to maintain previous state information generated by system control processor A (614) at some point in time prior to obtaining the composition request in step 1. In response to the determination, at step 21, the system control processor signs the previous state information and stores the signed previous state information in the audit storage (622).

At step 22, system control processor B (634) generates current state information associated with IHS B (630). The generated current state information associated with IHS B (630) specifies solid state disk B (636) was virtualized to obtain storage resource B (624). At step 23, system control processor B (634) stores the current state information associated with IHS B (630) in the distributed state storage system (626). At step 24, system control processor B (634) determines that the distributed state storage system (624) is unable to maintain previous state information generated by system control processor B (634) at some point in time prior to obtaining the composition request in step 1. In response to the determination, at step 25, the system control processor signs the previous state information and stores the signed previous state information in the audit storage (622).

At step 26, system control processor A (614) performs audit storage verification on the previous state information generated by system control processor B (634). At step 27, system control processor A (614) determines that there are no validation issues associated with the previous state information generated by system control processor B (634) and validates the previous state information generated by system control processor B (634) by tagging it. At step 28, system control processor B (634) performs audit storage verification on the previous state information generated by system control processor A (614). At step 29, system control processor B (634) determines that there are no validation issues associated with the previous state information generated by system control processor A (614) and validates the previous state information generated by system control processor A (614) by tagging it.

End of Example

Thus, as illustrated in FIGS. 6.1-6.4, embodiments of the invention may provide a system that enables the current state and previous states of composed information handling systems to be maintained, validated, and used to restore management entities such as system control processor managers.

Figure 7:
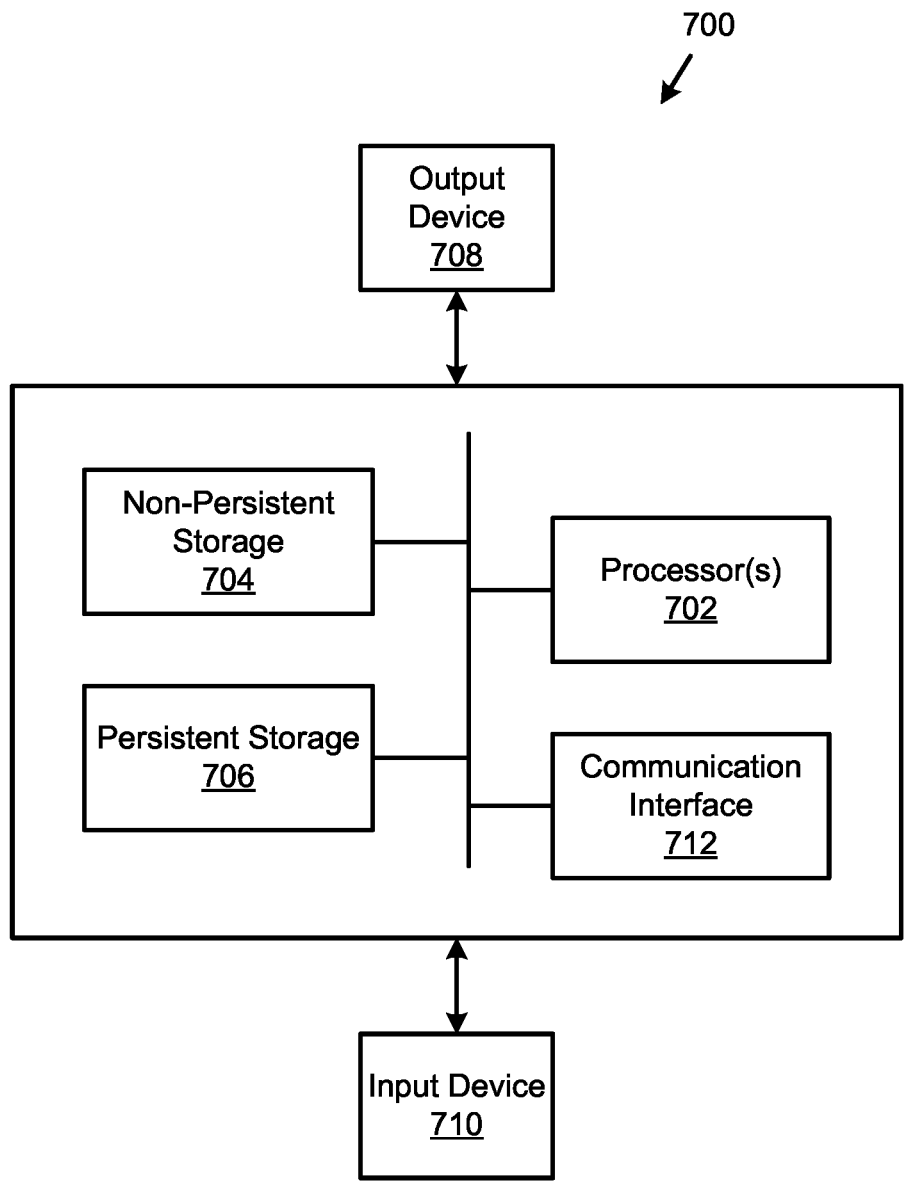
FIG. 7 shows a diagram of a computing device in accordance with one or more embodiments of the invention.

As discussed above, embodiments of the invention may be implemented using computing devices. FIG. 7 shows a diagram of a computing device in accordance with one or more embodiments of the invention. The computing device (700) may include one or more computer processors (702), non-persistent storage (704) (e.g., volatile memory, such as random access memory (RAM), cache memory), persistent storage (706) (e.g., a hard disk, an optical drive such as a compact disk (CD) drive or digital versatile disk (DVD) drive, a flash memory, etc.), a communication interface (712) (e.g., Bluetooth interface, infrared interface, network interface, optical interface, etc.), input devices (710), output devices (708), and numerous other elements (not shown) and functionalities. Each of these components is described below.

In one embodiment of the invention, the computer processor(s) (702) may be an integrated circuit for processing instructions. For example, the computer processor(s) may be one or more cores or micro-cores of a processor. The computing device (700) may also include one or more input devices (710), such as a touchscreen, keyboard, mouse, microphone, touchpad, electronic pen, or any other type of input device. Further, the communication interface (712) may include an integrated circuit for connecting the computing device (700) to a network (not shown) (e.g., a local area network (LAN), a wide area network (WAN) such as the Internet, mobile network, or any other type of network) and/or to another device, such as another computing device.

In one embodiment of the invention, the computing device (700) may include one or more output devices (708), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (702), non-persistent storage (704), and persistent storage (706). Many different types of computing devices exist, and the aforementioned input and output device(s) may take other forms.

Embodiments of the invention may provide a system and method for performing state management services for composed information handling systems. Specifically, embodiments of the invention may provide state management services using system control processors, a distributed state storage system, and an audit storage without interrupting and/or hindering the performance of computer implemented services provided by the compute resource set and entities executing on the compute resource set. Consequently, even though the resulting composed information handling system control plane may be unaware of the implementation of the state management services provided by the system control processors, the distributed state storage system, and the audit storage, the current state and previous states of the composed information handling systems may be maintained, while previous states may be validated, thereby enabling the restoration of management entities using the state information, point in time restorations of composed information handling systems, and historical representations of composed information handling systems over time, resulting in the improved reliability of the composed information handling systems and the management entities.

Thus, embodiments of the invention may address the problem of component failures in composed systems and management entities associated with the composed systems. For example, by utilizing a system control processor manager to setup, during the instantiation of a composed information handling system, system control processors, a distributed state storage system, and an audit storage to perform state management services including the generation, distributed storage, and validation of current and previous state information that specifies the current state of the composed systems as a whole and previous states of the composed systems as a whole, the current and previous state information may be used to improve the reliability of composed systems and reduce the negative impacts of composed system failures and management entity failures.

The problems discussed above should be understood as being examples of problems solved by embodiments of the invention of the invention and the invention should not be limited to solving the same/similar problems. The disclosed invention is broadly applicable to address a range of problems beyond those discussed herein.

One or more embodiments of the invention may be implemented using instructions executed by one or more processors of a computing device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention as of the invention. Accordingly, the scope of the invention should be limited only by the attached claims.

What is claimed is:

1. A method for performing state management services for composed information handling systems, comprising:
   making a first determination that at least one control resource set is not associated with a distributed state storage system; and
   in response to the first determination:
      identifying first additional computing resources to instantiate the distributed state storage system;
      instantiating the distributed state storage system using the first additional computing resources;
      registering the at least one control resource set with the distributed state storage system;
      preparing the at least one control resource set to perform at least a first portion of the state management services using the distributed state storage system;
      making a second determination that the at least one control resource set is not associated with an audit storage; and
      in response to the second determination:
         identifying second additional computing resources to instantiate the audit storage;
         instantiating the audit storage using the second additional computing resources;
         registering the at least one control resource set with the audit storage; and
         preparing the at least one control resource set to perform at least a second portion of the state management services using the audit storage.

2. The method of claim 1, wherein the at least one control resource set comprises a plurality of system control processors.

3. The method of claim 2, wherein performing the at least the first and the second portion of the state management services by at least a portion of the plurality of system control processors is transparent to an application executing on a processor of the at least one compute resource set.

4. The method of claim 3, wherein the state management services comprise:
   obtaining, by a system control processor of the plurality of system control processors, a request to perform the state management services from a system control processor manager;
   generating, by the system control processor, current state information associated with the system control processor;
   storing, by the system control processor, the current state information in the distributed state storage system;
   making, by the system control processor, a third determination that the distributed state storage system is not able to maintain previous state information; and
   in response to the third determination:
      storing, by the system control processor, the previous state information in the audit storage; and
      performing, by the system control processor, audit storage verification.

5. The method of claim 4, wherein performing the audit storage verification comprises verifying previous state information associated with the plurality of system control processors stored in the audit storage.

6. The method of claim 4, wherein the distributed state storage system is accessible by the plurality of system control processors.

7. The method of claim 6, wherein the distributed state storage system comprises a plurality of state information generated by the plurality of system control processors, wherein the plurality of state information comprises the current state information.

8. The method of claim 4, wherein the audit storage is accessible by the plurality of system control processors.

9. The method of claim 8, wherein the audit storage comprises a plurality of directed acyclic graphs associated with the plurality of system control processors.

10. The method of claim 9, wherein a directed acyclic graph of the plurality of directed acyclic graphs specifies all previous state information associated with a system control processor of the plurality of system control processors.

11. The method of claim 1, further comprising:
    prior to making the first determination that the at least one control resource set is not associated with the distributed state storage system:
       obtaining a composition request for a composed information handling system;
       identifying at least one compute resource set having compute resources specified by the composition request;
       identifying at least one hardware resource set having hardware resources specified by the composition request;
       setting up state management services using an at least one control resource set to obtain logical hardware resources, wherein the at least one control resource set performs at least a portion of the state management services; and
       presenting the logical hardware resources using the at least one control resource set to the at least one compute resource set as bare metal resources to instantiate the composed information handling system to service the composition request.

12. A non-transitory computer readable medium comprising computer readable program code, which when executed by a computer processor enables the computer processor to perform a method for performing state management services for composed information handling systems, the method comprising:
    making a first determination that at least one control resource set is not associated with a distributed state storage system; and
    in response to the first determination:
       identifying first additional computing resources to instantiate the distributed state storage system;
       instantiating the distributed state storage system using the first additional computing resources;
       registering the at least one control resource set with the distributed state storage system;
       preparing the at least one control resource set to perform at least a first portion of the state management services using the distributed state storage system;
       making a second determination that the at least one control resource set is not associated with an audit storage; and
       in response to the second determination:
          identifying second additional computing resources to instantiate the audit storage;
          instantiating the audit storage using the second additional computing resources;

registering the at least one control resource set with the audit storage; and preparing the at least one control resource set to perform at least a second portion of the state management services using the audit storage.

13. The non-transitory computer readable medium of claim 12, wherein the at least one control resource set comprises a plurality of system control processors.

14. The non-transitory computer readable medium of claim 13, wherein performing the at least the first and the second portion of the state management services by at least a portion of the plurality of system control processors is transparent to an application executing on a processor of the at least one compute resource set.

15. The non-transitory computer readable medium of claim 14, wherein the state management services comprise:

obtaining, by a system control processor of the plurality of system control processors, a request to perform the state management services from a system control processor manager;

generating, by the system control processor, current state information associated with the system control processor;

storing, by the system control processor, the current state information in the distributed state storage system;

making, by the system control processor, a third determination that the distributed state storage system is not able to maintain previous state information; and in response to the third determination:
storing, by the system control processor, the previous state information in the audit storage; and
performing, by the system control processor, audit storage verification.

16. The non-transitory computer readable medium of claim 15, wherein performing audit storage verification comprises verifying previous state information associated with the plurality of system control processors stored in the audit storage.

17. A system for performing state management services for composed information handling systems, comprising:

a plurality of information handling systems comprising a plurality of system control processors; and a system control processor manager, comprising a processor and memory, programmed to:
make a first determination that at least one control resource set is not associated with a distributed state storage system; and in response to the first determination:
identify first additional computing resources to instantiate the distributed state storage system;
instantiate the distributed state storage system using the first additional computing resources;
register the at least one control resource set with the distributed state storage system;
prepare the at least one control resource set to perform at least a first portion of the state management services using the distributed state storage system;
make a second determination that the at least one control resource set is not associated with an audit storage; and in response to the second determination:
identify second additional computing resources to instantiate the audit storage;
instantiate the audit storage using the second additional computing resources;
register the at least one control resource set with the audit storage; and
prepare the at least one control resource set to perform at least a second portion of the state management services using the audit storage.

18. The system of claim 17, wherein the at least one control resource set comprises a plurality of system control processors.

19. The system of claim 18, wherein performing the at least the first and the second portion of the state management services by at least a portion of the plurality of system control processors is transparent to an application executing on a processor of the at least one compute resource set.

20. The system of claim 19, wherein the state management services comprise:

obtaining, by a system control processor of the plurality of system control processors, a request to perform the state management services from a system control processor manager;

generating, by the system control processor, current state information associated with the system control processor;

storing, by the system control processor, the current state information in the distributed state storage system;

making, by the system control processor, a third determination that the distributed state storage system is not able to maintain previous state information; and in response to the third determination:
storing, by the system control processor, the previous state information in the audit storage; and
performing, by the system control processor, audit storage verification.

* * * * *